Feb. 4, 1930.　　　　E. H. BLUNT　　　　1,745,597
FEEDWATER HEATER
Filed Dec. 1, 1922　　14 Sheets-Sheet 3
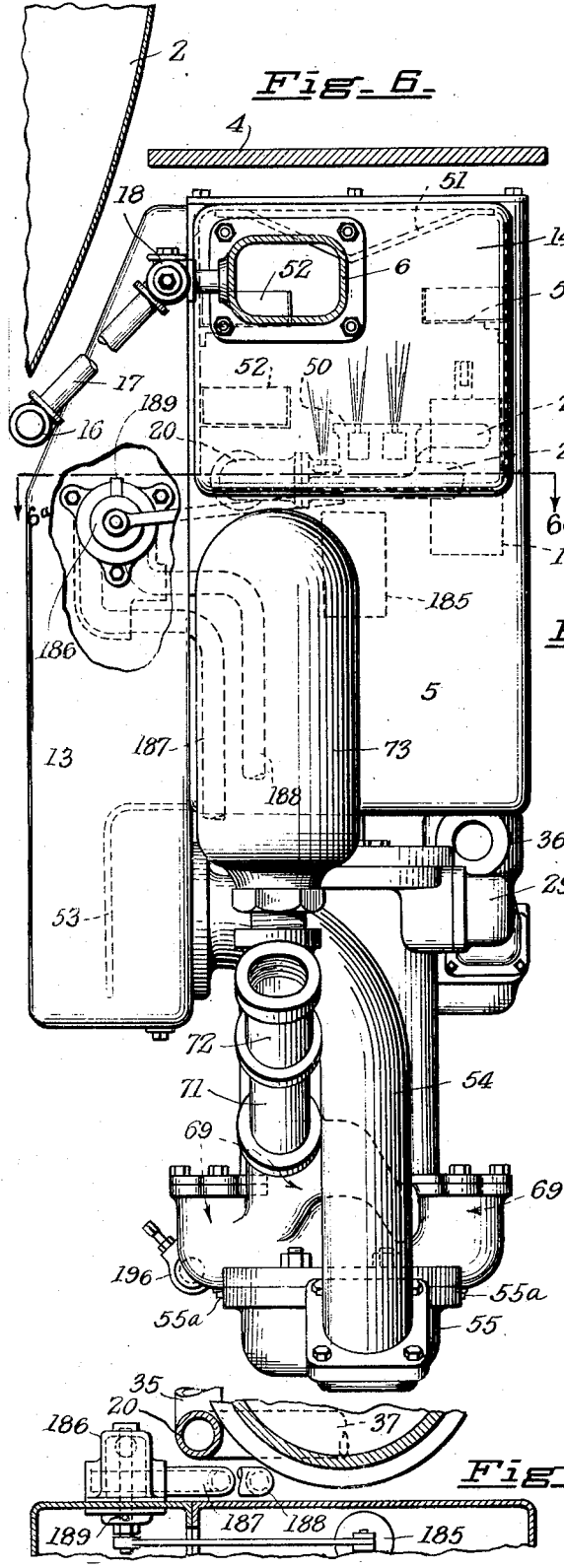
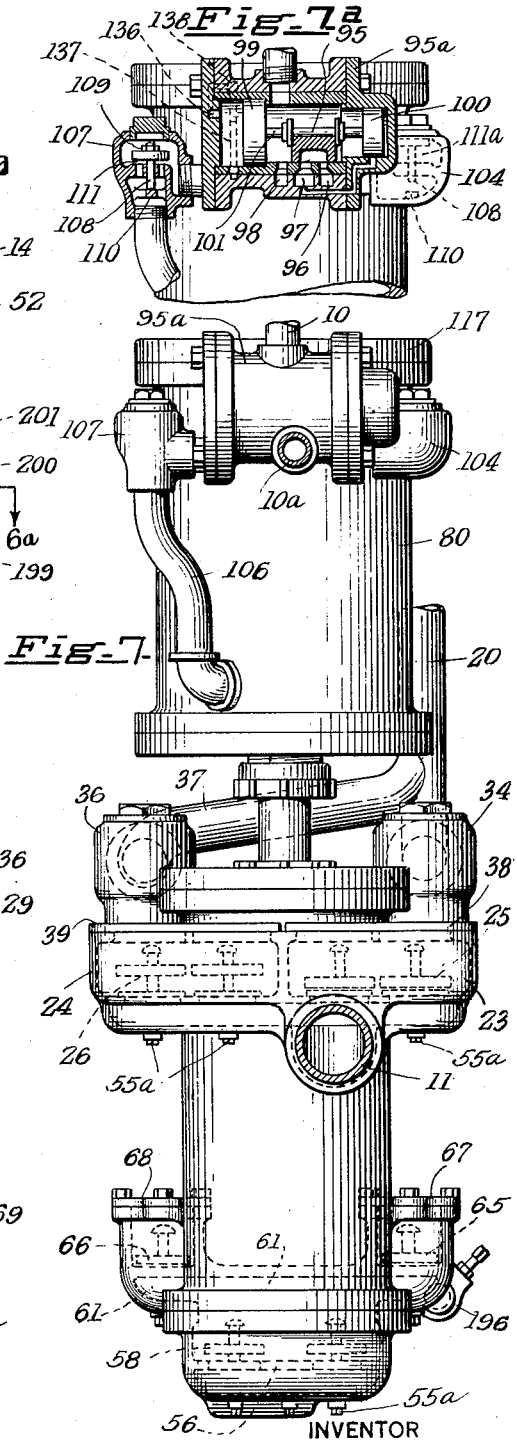
INVENTOR
Edmund H. Blunt,
BY
ATTORNEY

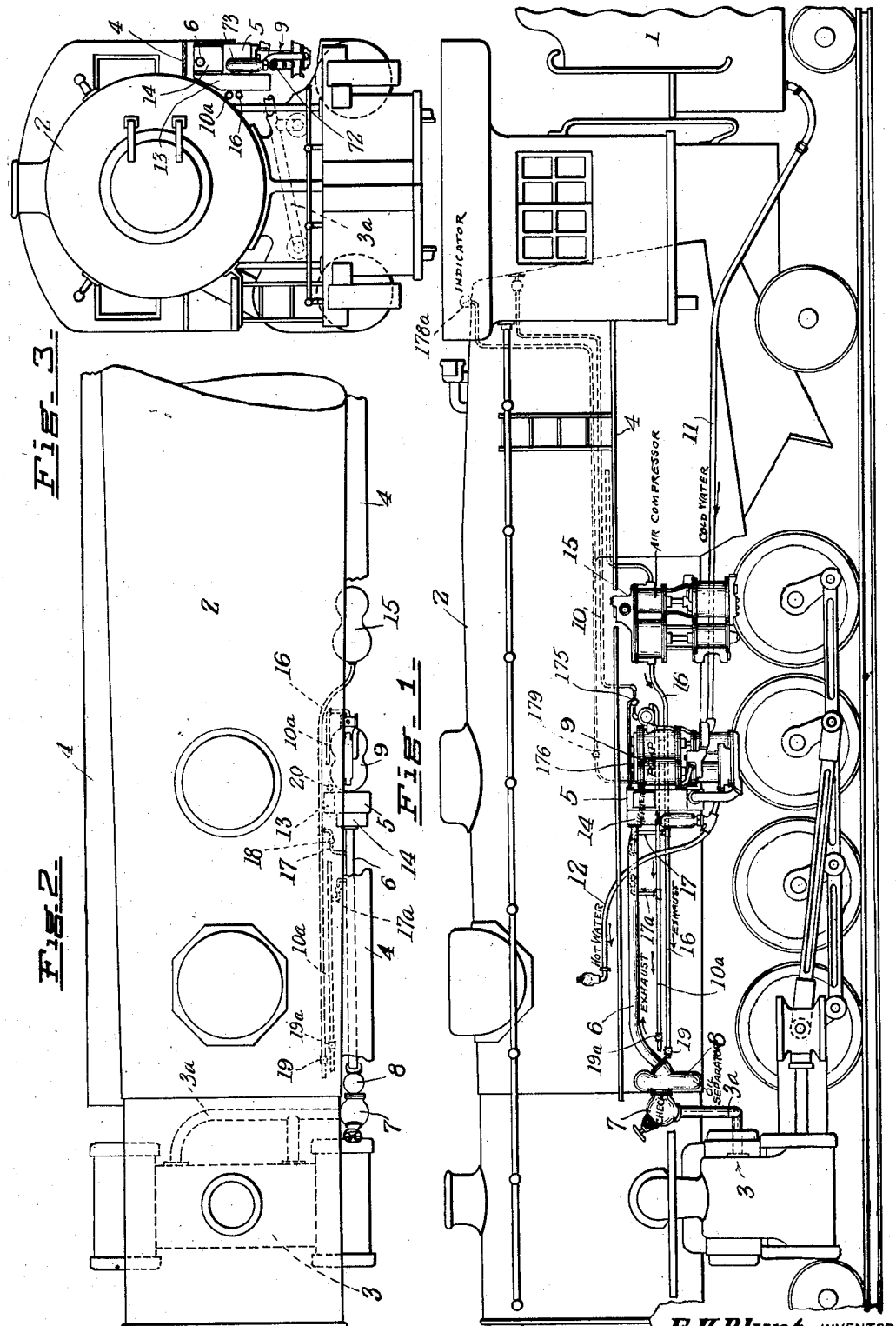

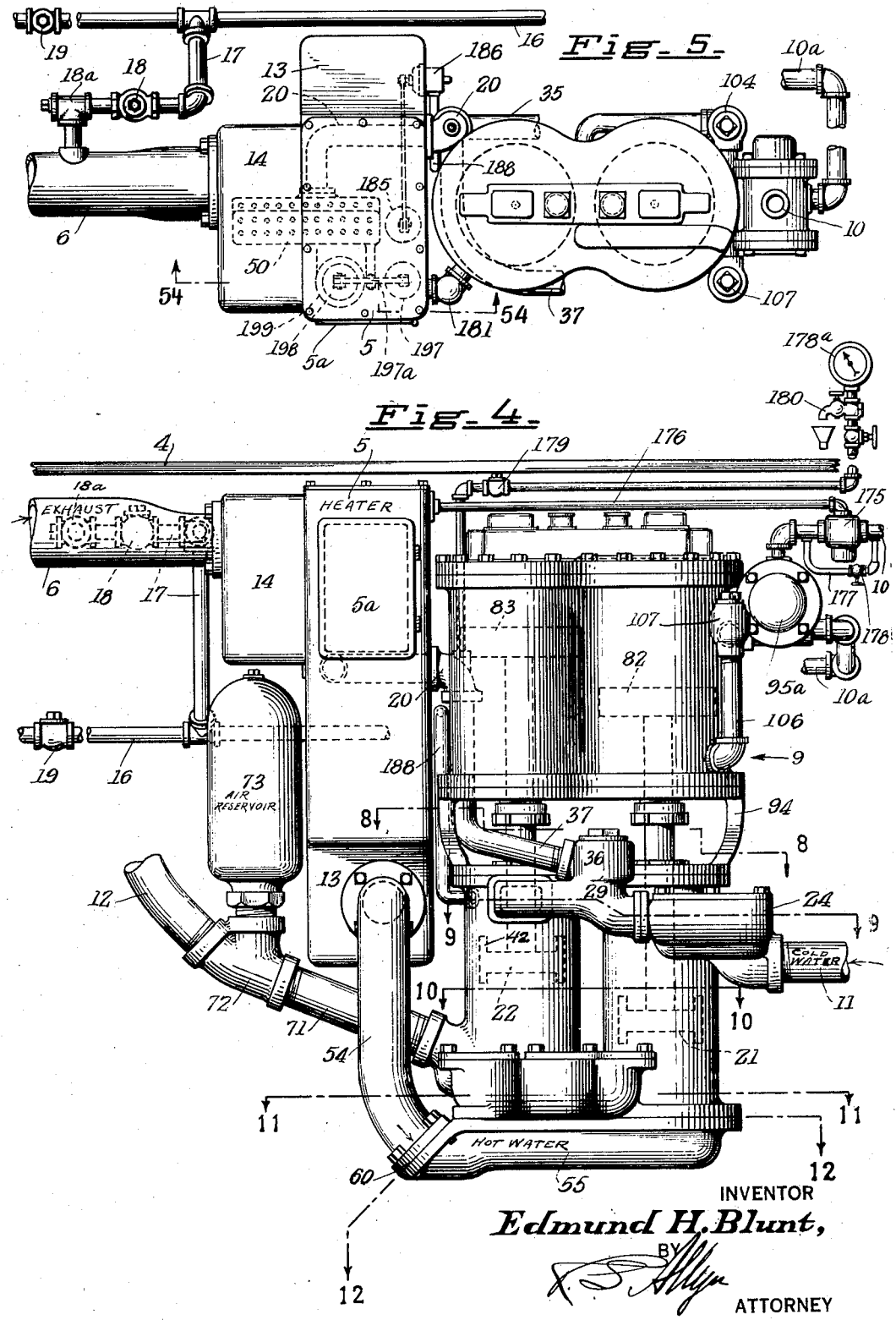

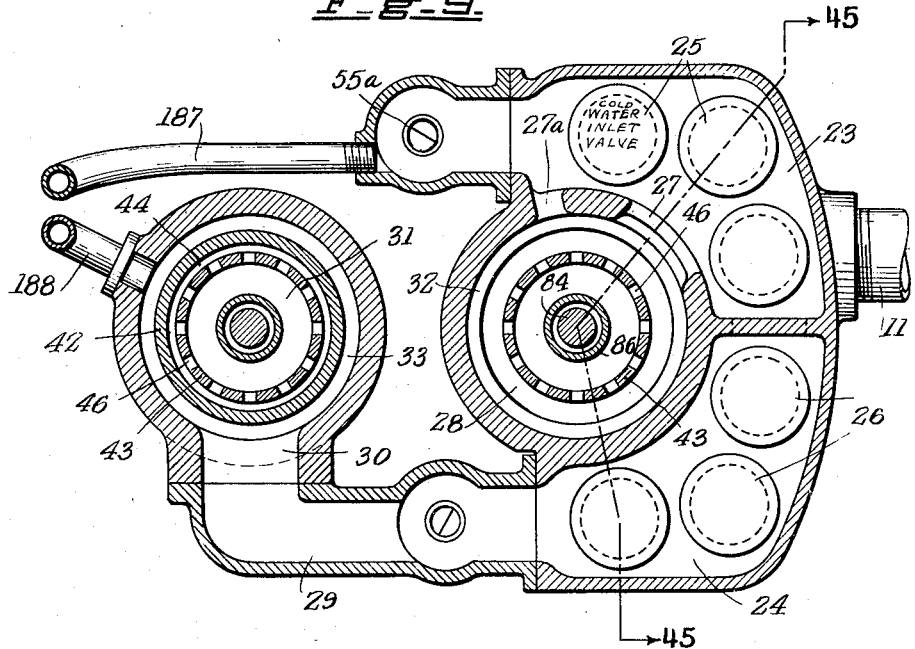
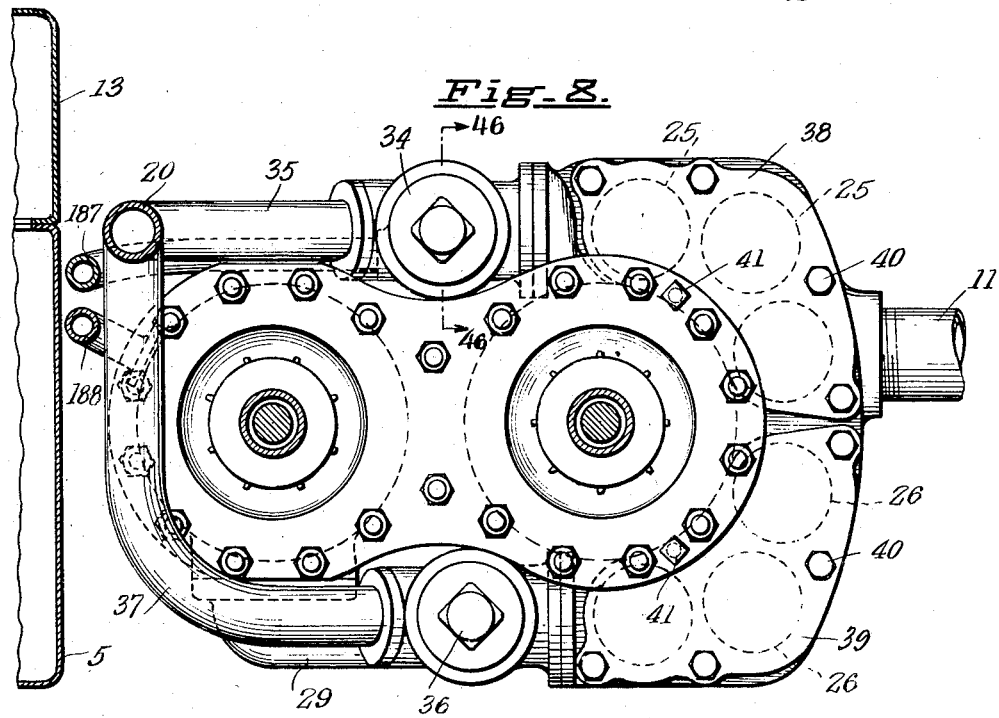

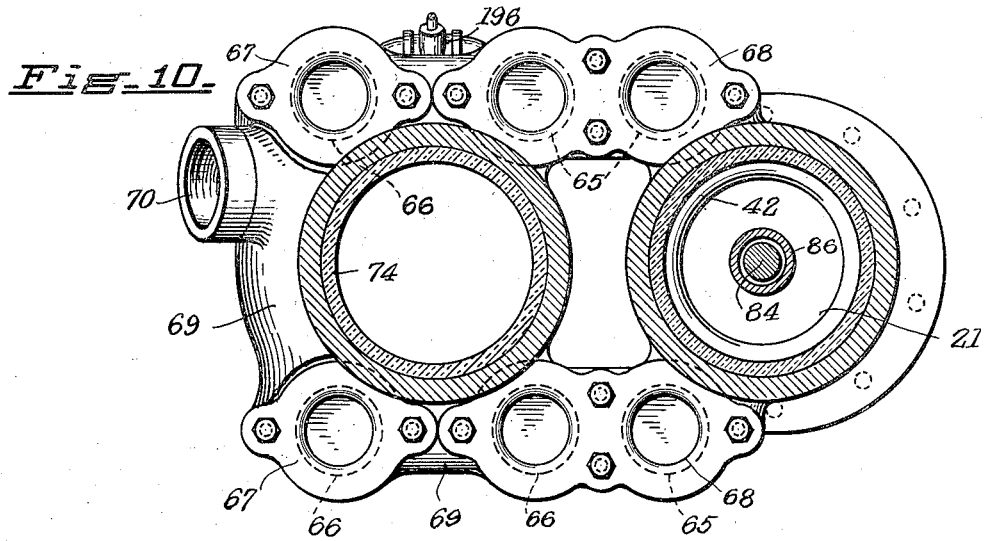
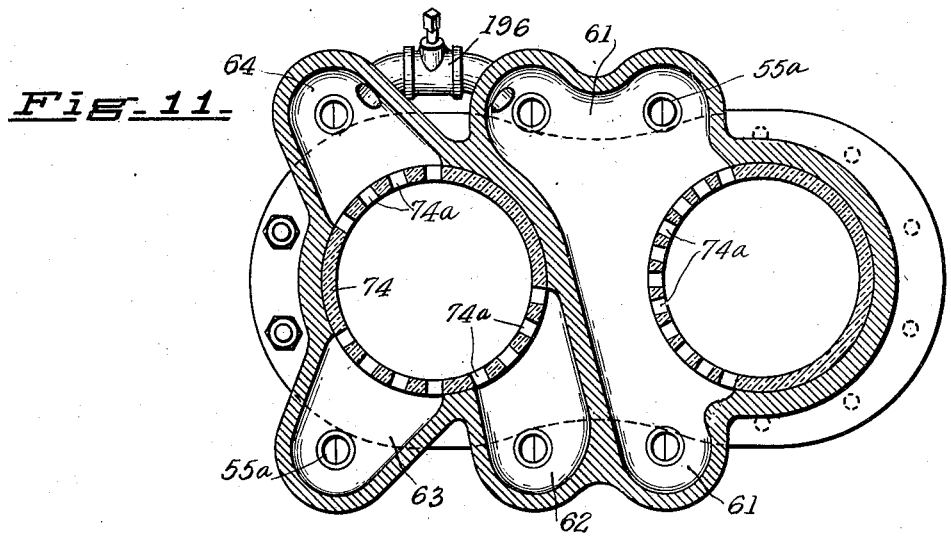
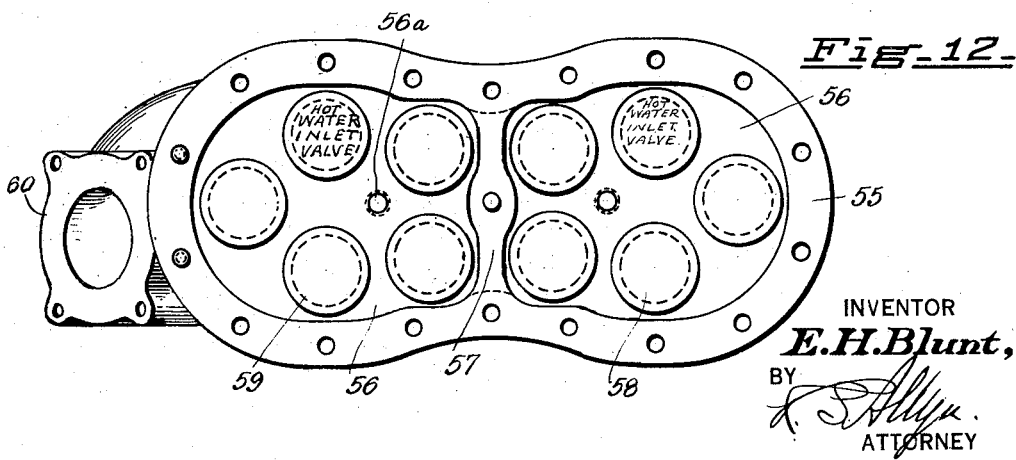

Feb. 4, 1930. E. H. BLUNT 1,745,597
FEEDWATER HEATER
Filed Dec. 1, 1922 14 Sheets-Sheet 6
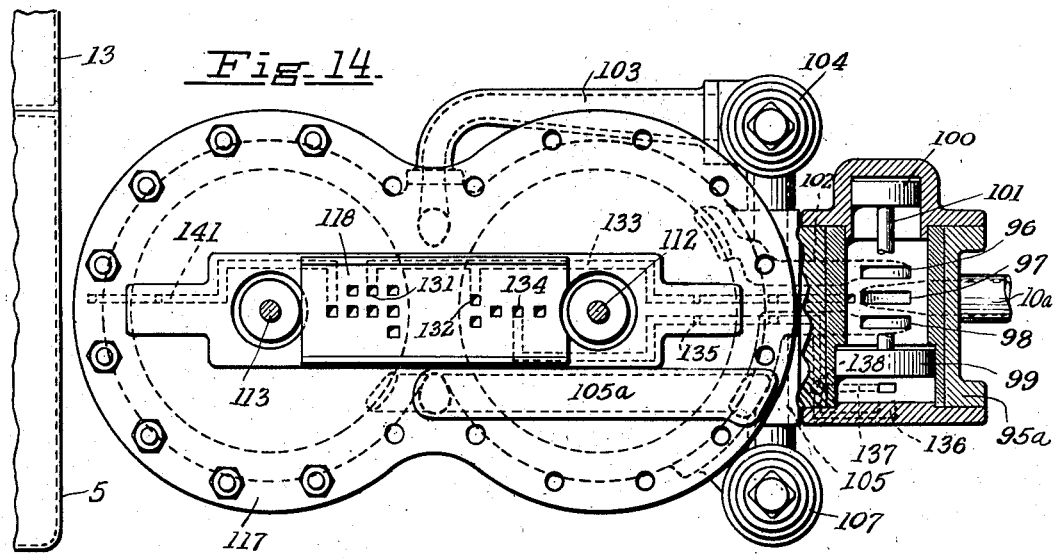
Fig. 14.
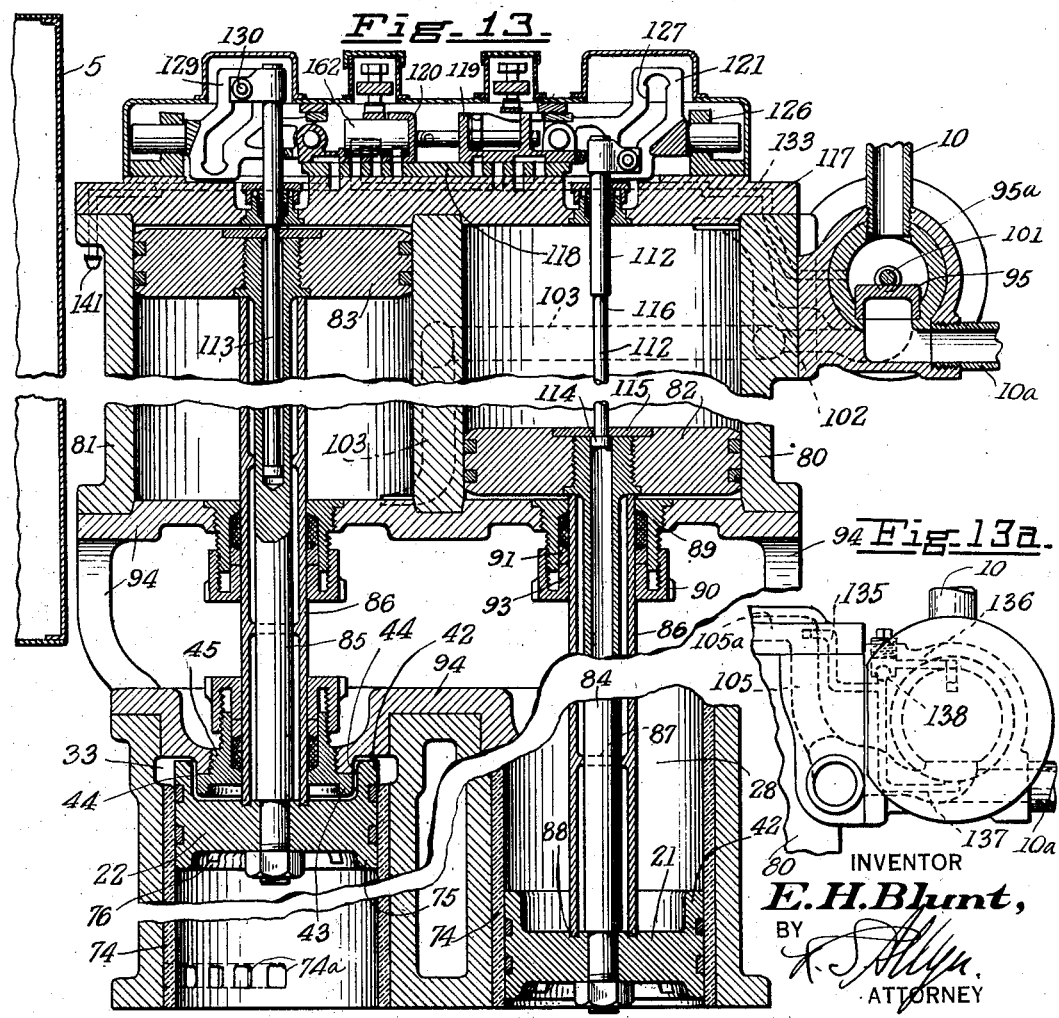
Fig. 13.
Fig. 13a.
INVENTOR
E. H. Blunt,
BY
ATTORNEY

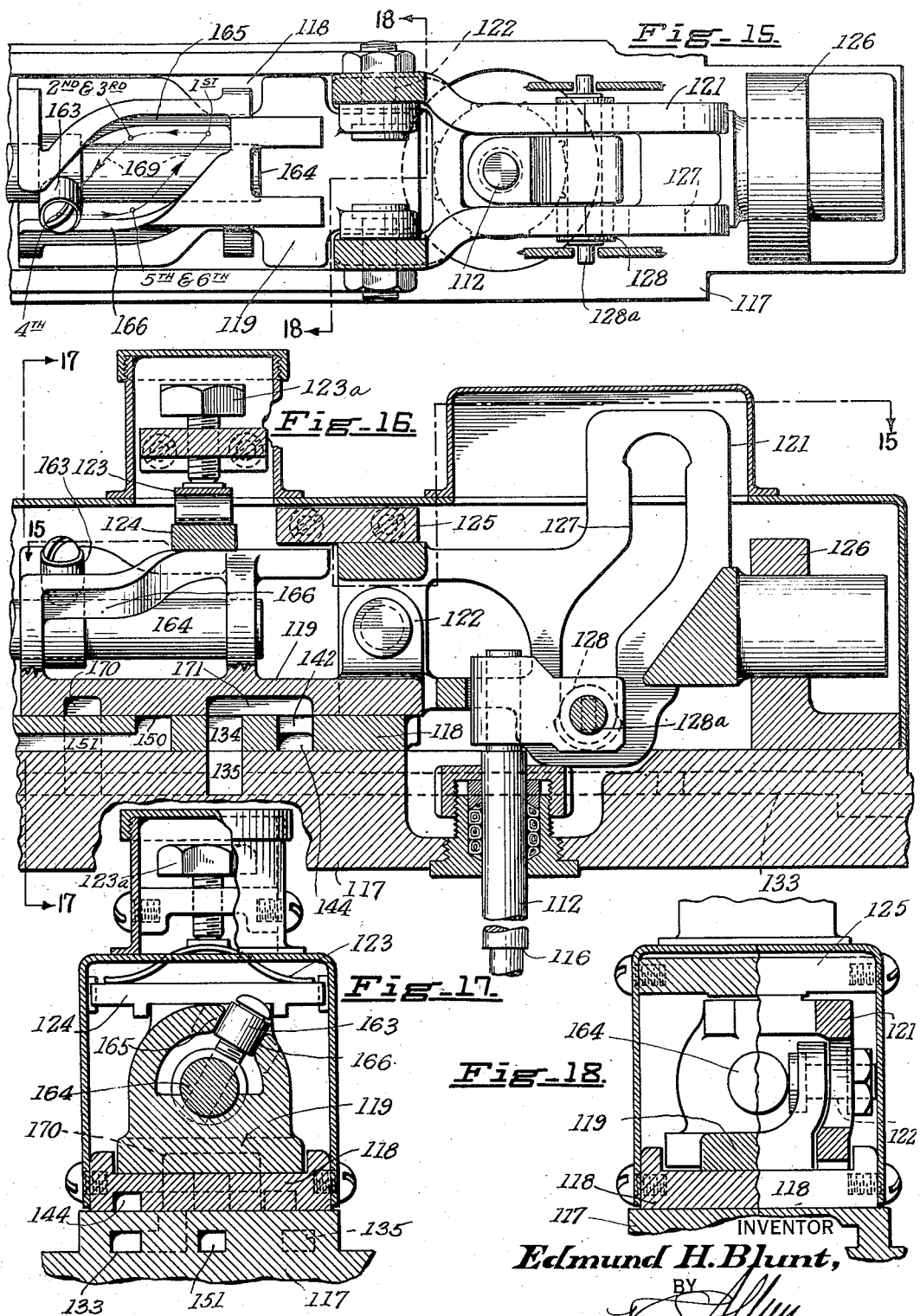

Feb. 4, 1930.　　　　E. H. BLUNT　　　　1,745,597
FEEDWATER HEATER
Filed Dec. 1, 1922　　14 Sheets-Sheet 8

INVENTOR
Edmund H. Blunt,
ATTORNEY

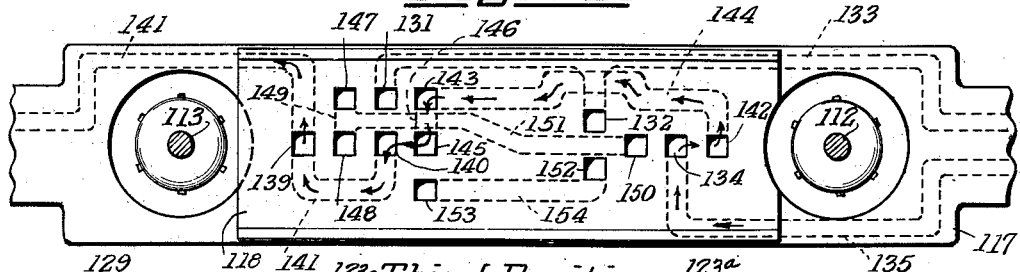
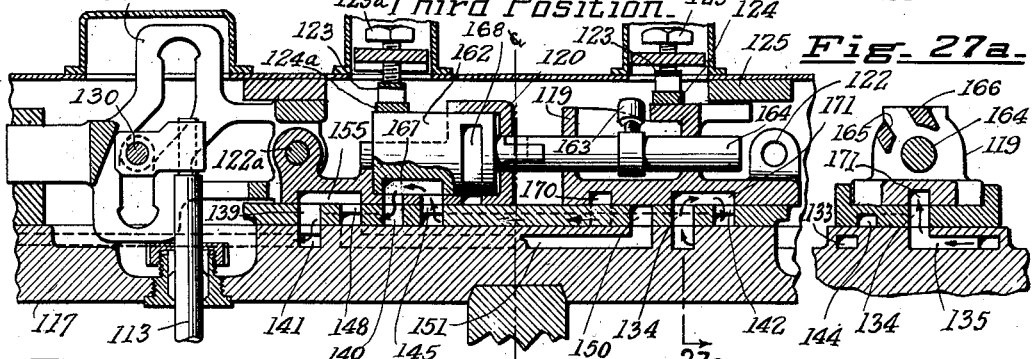
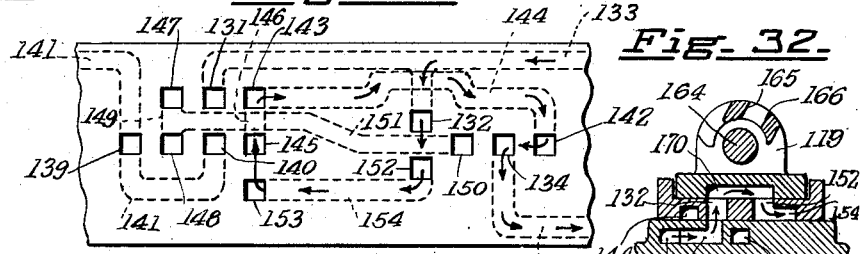
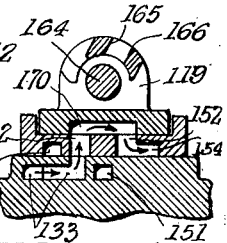
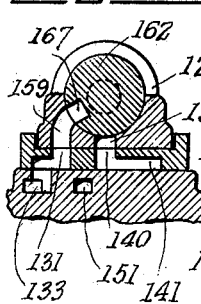
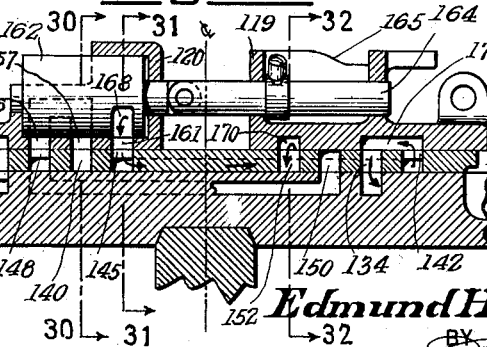
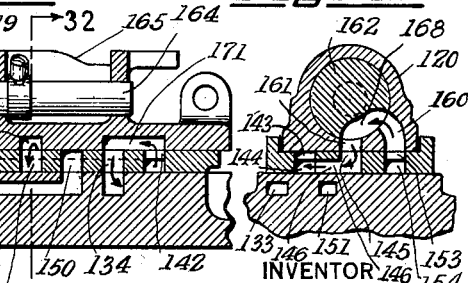

Feb. 4, 1930.  E. H. BLUNT  1,745,597
FEEDWATER HEATER
Filed Dec. 1, 1922  14 Sheets-Sheet 10
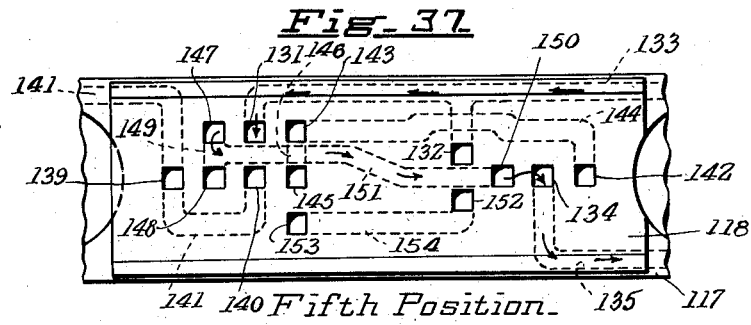
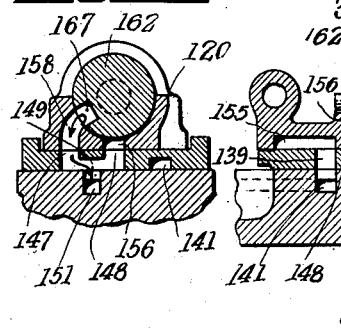
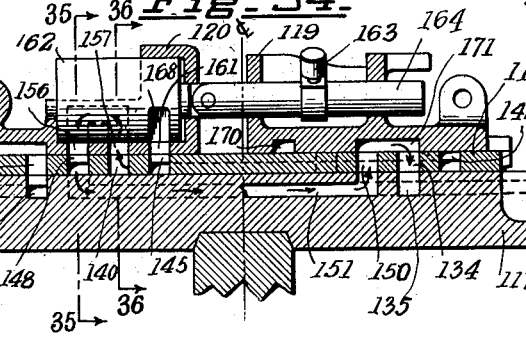
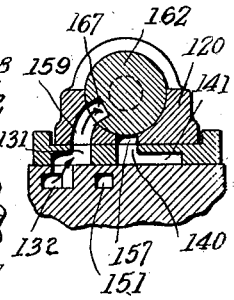
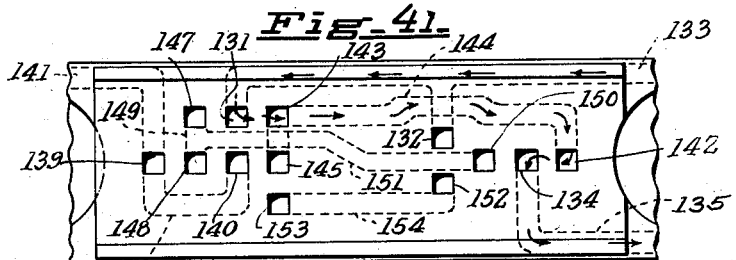
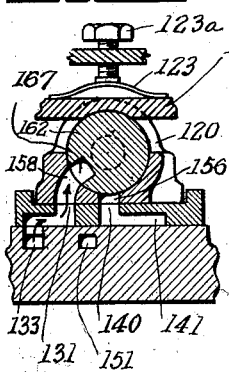
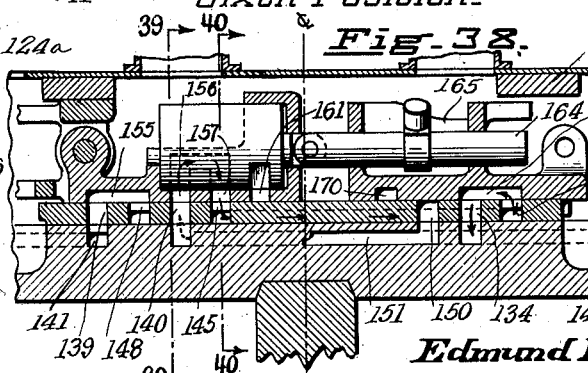
INVENTOR
Edmund H. Blunt,
BY
ATTORNEY

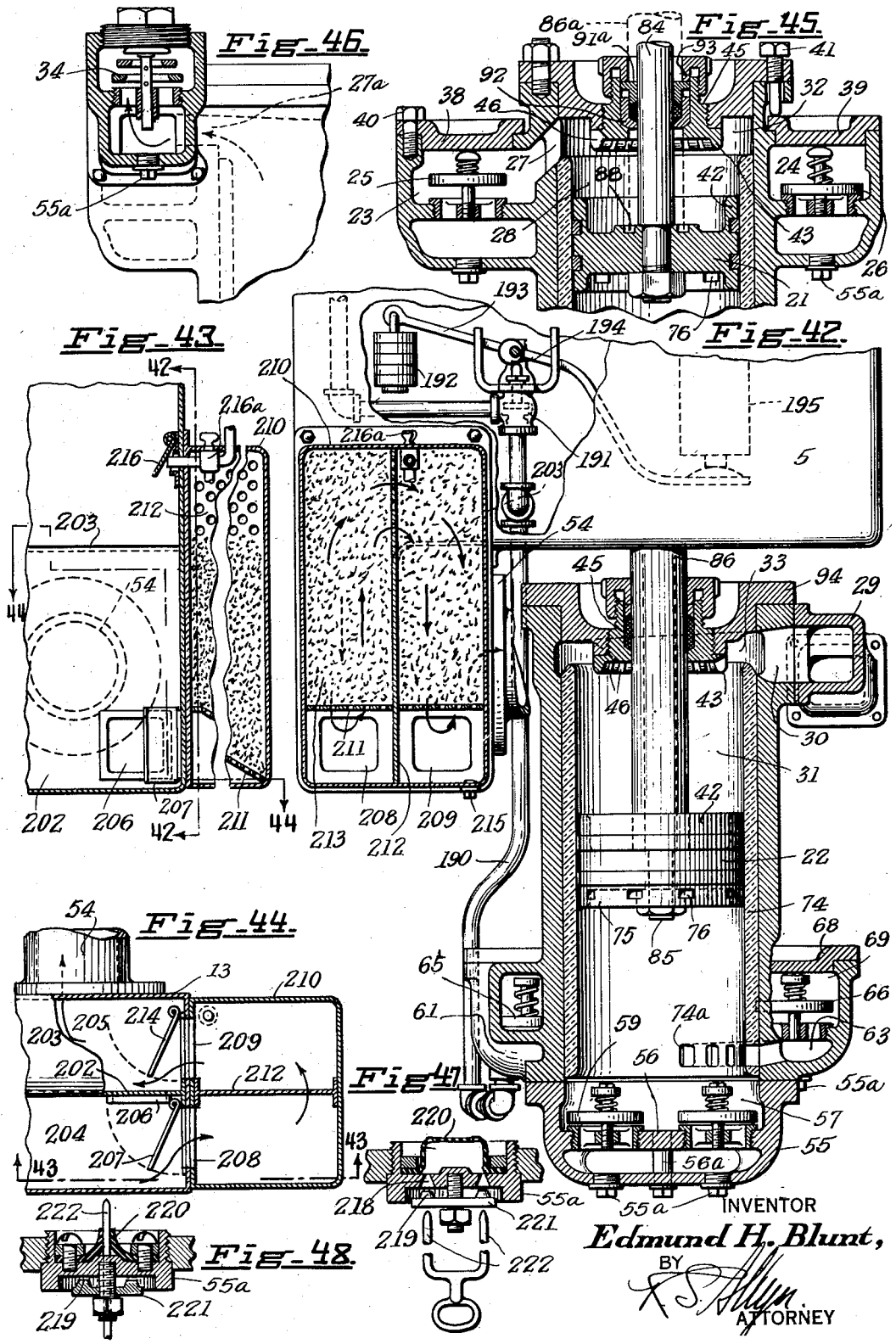

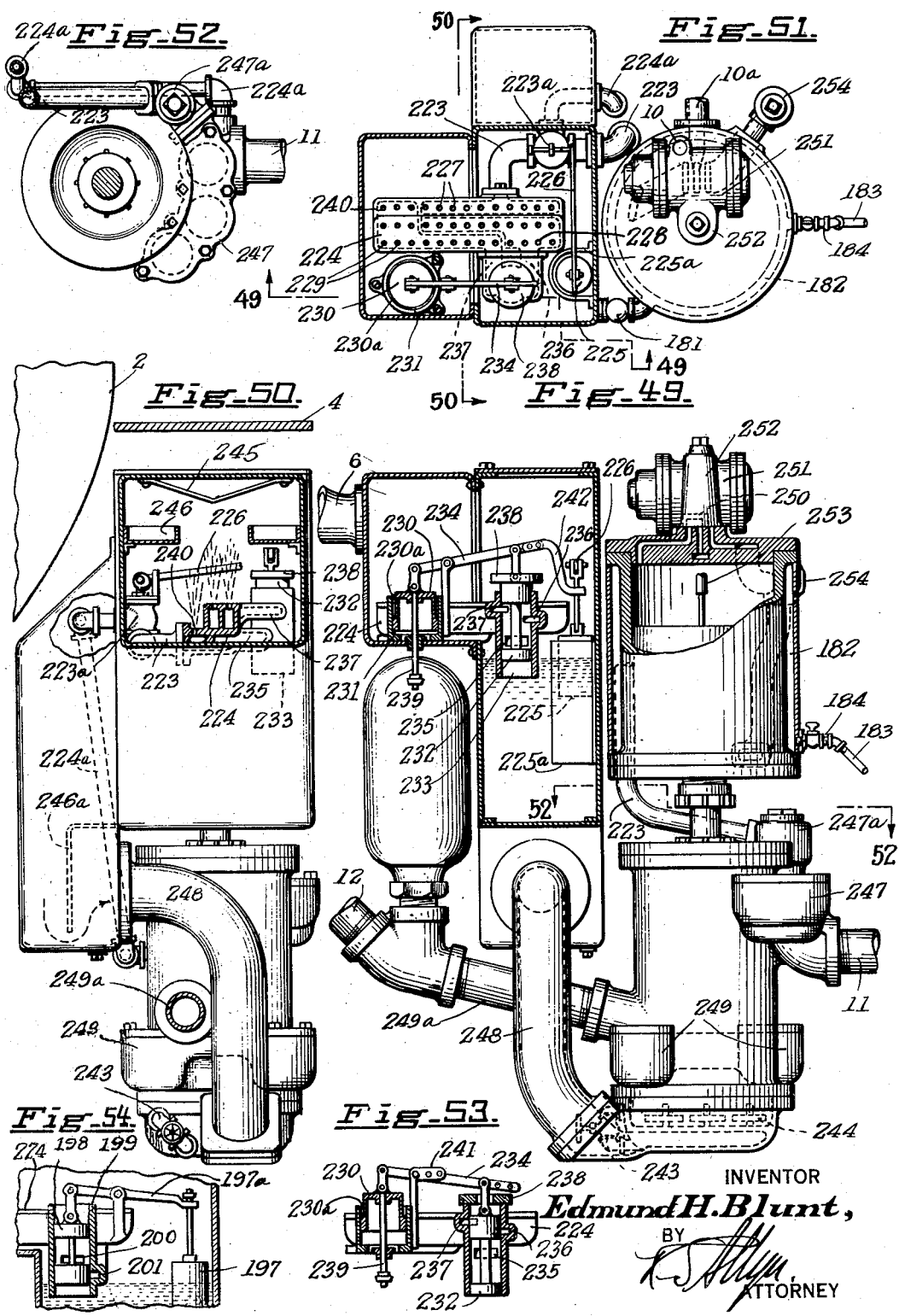

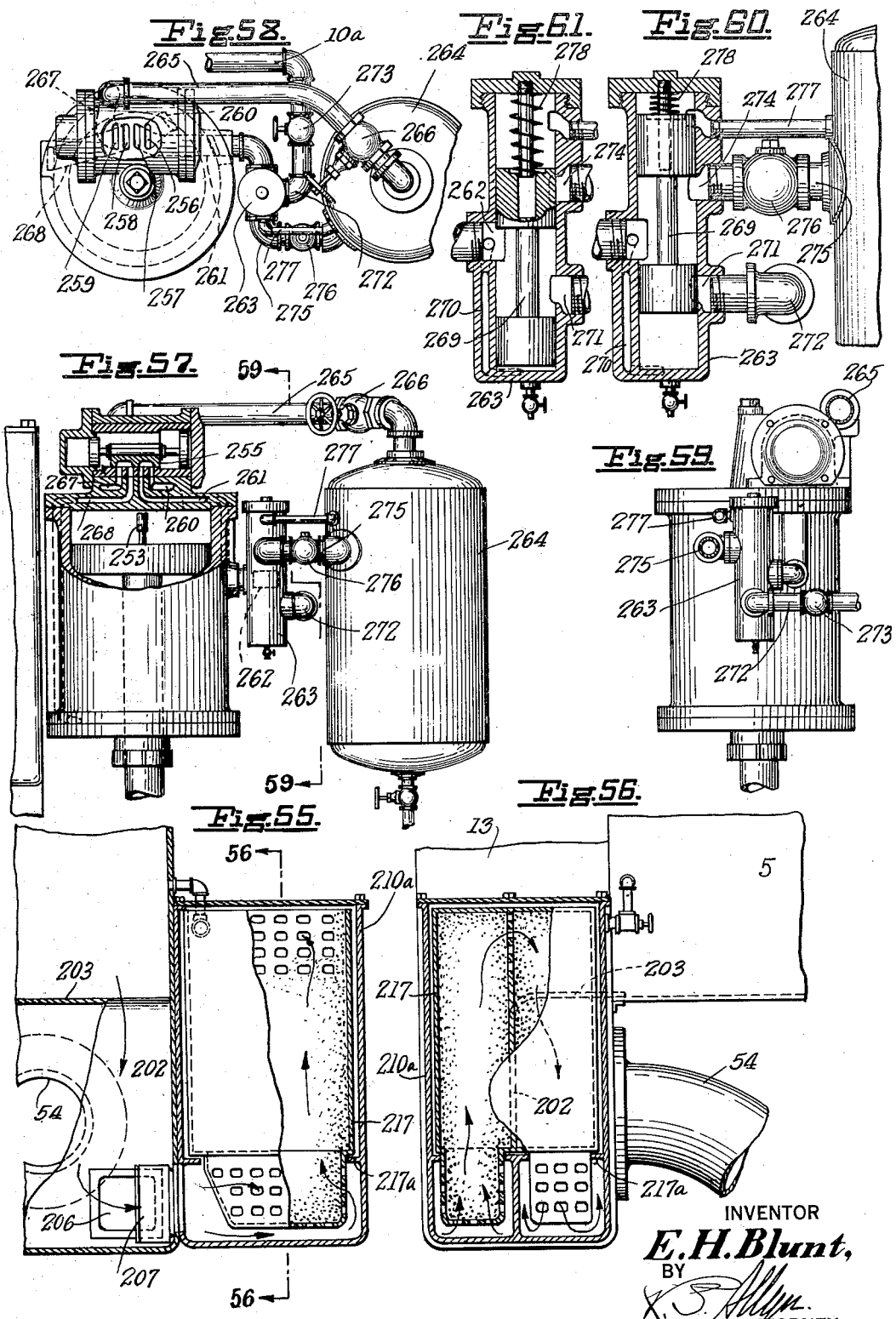

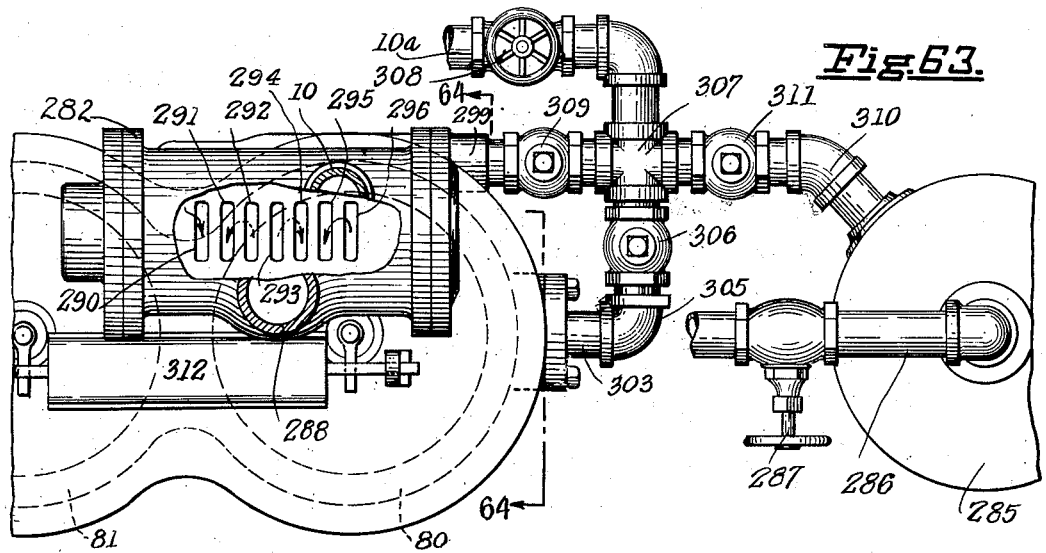
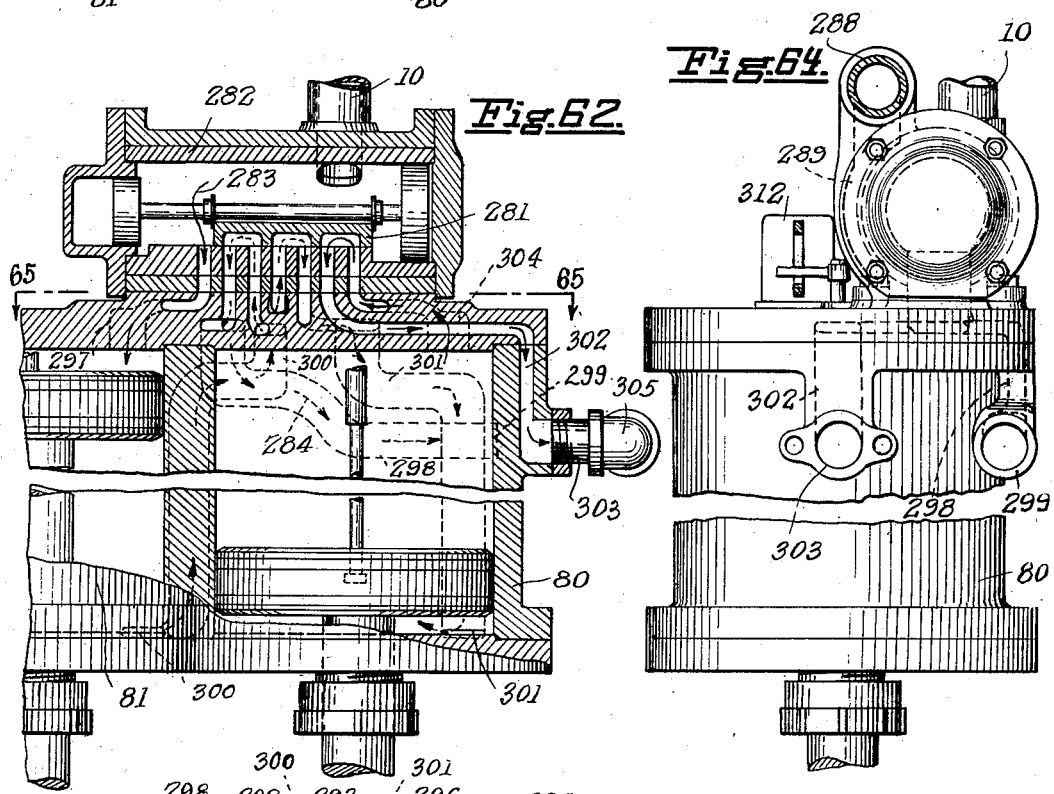
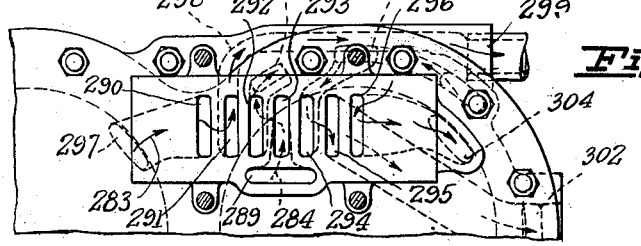

Patented Feb. 4, 1930

1,745,597

UNITED STATES PATENT OFFICE

EDMUND H. BLUNT, OF NEW YORK, N. Y.

FEED-WATER HEATER

Application filed December 1, 1922. Serial No. 604,414.

My invention relates particularly to apparatus for heating feedwater for locomotive boilers and has particular reference to what is commonly termed the open type heater. In such constructions the cold feedwater is sprayed into a chamber which receives exhaust steam. The steam is thus condensed and the water heated in this chamber. The heated feedwater is withdrawn from this chamber and forced into the boiler by means of pump action. My former application #448,778, filed March 1, 1921, which has matured into Patent 1,551,727, shows one form of apparatus of this type. My present invention contemplates improvements on the construction etc. of my former application.

One object of my present invention is to construct apparatus having materially greater capacity and at the same time keep the parts compact and yet accessible within the limits imposed by current locomotive design. Another object is to insure uniformity of action under varying conditions of operation. Another object is to make the apparatus compact and susceptible of standardization to general locomotive design.

I have specifically sought to automatically govern the pump action in accordance with the quantity of exhaust steam available for heating purposes. Another object is to regulate the speed of the pump under varying conditions of demand. Another object is to so control the pump action as to avoid excessive strains.

Another object is to regulate the steam supplied to the opposite sides of the pistons in accordance with the work necessary to be done. Another object is to normally permit the exhaust from the said pump to escape for instance to the stack, but to utilize this exhaust in the heater when the normal heater supply is deficient. Another object is to take some of the excess steam from the heater in such a manner as to utilize the heat from it and condense the steam. Another object is to reduce the condensation in the heater when the water level reaches a predetermined height.

Another object is to cushion the pump action and thus obtain a maximum pumping capacity with a minimum length of cylinder. Another object is to stop or slow down the pump automatically when the water level in the heater reaches an extreme low mark. Another object is to automatically return to the heater or to the heater side of the pump some of the hot water when the water level falls below a predetermined point. Another object is to regulate the speed of the pump in some direct ratio to the pressure of the exhaust steam in the heater tank. Another object is to allow an excess of cold water at certain times to pass from one pump to the other so as to prevent flooding the heater. Another object is to pass some of the hot water from one pump to the other at certain times so as to prevent abnormal lowering of the water level in the heater tank. In a single unit apparatus the hot water would be passed back to the heater or the heater side of the valve. Another object is to approximately synchronize the action of the two water pumps. Another object is to control the time of a pump cycle by varying the resistance to the discharge of water into the heater. Another object is to avoid trapping or pocketing air in the upper part of the pump cylinder and passages. Another object is to vary the amount of hot-water flow to the pump in some direct ratio to the steam pressure in the heater vessel. Another object is to use part of the high pressure exhaust of the pump, so as to operate the return stroke; for instance compounding. Another object is to provide the longest time for the spray to remain in the vapor space, by spraying upward and deflecting laterally to collecting trays. Another object is to place the water valves as nearly as possible in the direct line of flow, and so eliminate unnecessary changes of direction, for instance; all the cold inlet valves are placed between the source of supply and the points of delivery, that is, grouped about the right hand pump and near the top. Another object is to provide a maximum length of pump stroke in a given space. Another object is to obtain a maximum static hot water head on the suction valves for a given condition. Another object is to adapt the heater tank to variations of locomotive boiler designs. Another object is to permit convenient testing of the water valves while under static water pressure. Another object is to construct the apparatus so that it can be suspended at a low level and take advantage of a maximum head on cold water suction valves. Another object is to facilitate the removal and repacking of the piston rod stuffing box units without removing the rods. Another object is to permit the employment of a piston rod sleeve in some cases without subjecting the sleeve to substantial compression. Another object is to purify the water by providing filtering material which can be readily replaced without interfering with the operation of the apparatus. Another object is to provide means for satisfactorily indicating or registering the speed of the pump.

Other details of the invention will be understood from the following specification, in which I have described not only the preferred construction but some modifications and alternative combinations.

In one form of apparatus as herein shown and described, I employ two pump cylinders and pistons, each of which is single acting on both ends as set forth in my former application, that is, each piston draws cold feed-water into the cylinder on one side of the piston at the same time that it is forcing hot water from the other end of the cylinder to the boiler. On the next stroke of the piston, the cold water is forced into the heater and hot water is withdrawn from the heater into the opposite end of the cylinder. These two water pistons are connected to steam pistons and start moving simultaneously in opposite directions. The steam pistons are controlled by a main steam valve and two auxiliary reversing valves. These auxiliary valves are controlled by the movement of the pistons so as to reverse the action of the main valve when the two pistons have reached the ends of their strokes respectively.

Inasmuch as the feedwater requires only a comparatively small pressure to force it into the heater and a relatively large pressure to force it into the boiler, I provide means for applying correspondingly different pressures on the opposite sides of each steam piston. This may be accomplished by a reducing valve of special design as shown in one form of the invention, or by means of a compounding arrangement as shown in another form which has other advantages.

In view of the very small space available on the locomotive for apparatus of this kind, I have designed the parts as compactly as possible and yet so as to facilitate assembling, testing, adjustment, and repair.

I have also endeavored to construct the pump parts so as to check the movable parts gradually and avoid shock.

On account of the variations which occur in the conditions and the widely varying temperatures in which the apparatus must be capable of operating with a minimum of attention and adjustment, I have sought to automatically take care of an excess amount of feedwater by means of a circulating system, so that the excess of cold feed-water from one pump is passed back to the other pump, and an excess of hot water from one pump can be passed around to the other pump, or around the valves and back to the heater.

When a locomotive is in operation on the road, it is frequently called upon to "drift" or run without any appreciable amount of steam being used. As a consequence, there is but little exhaust steam. Most forms of feedwater heaters require that under such circumstances the feed pump be slowed down or stopped by hand to prevent the pumping of cold water into the boiler; said pump being started up again when the locomotive is again using steam. Such requirement, however, demands altogether too much attention from the engineer, while, if neglected, it results in improper operation. I propose to control the speed of the pumps automatically; for instance, by means of changes in pressure of the exhaust steam in the heater.

Figure 1 is a side view showing one form of locomotive with feedwater heating apparatus embodying improvements of my invention.

Fig. 2 is a plan view showing parts of the same.

Fig. 3 is an end view of the same.

Fig. 4 is an outside view of the principal novel parts of the apparatus shown in Figs. 1 and 2.

Fig. 5 is a top plan view of the same.

Fig. 6 is a front view of the same apparatus.

Fig. 6ᵃ is a fragmentary plan and section on line 6ᵃ—6ᵃ of Fig. 6.

Fig. 7 is a rear view of the right hand pump.

Fig. 7ᵃ is a vertical longitudinal section of the main steam valve.

Fig. 8 is a plan view of the pump showing the piston rods in section on the line 8—8, Fig. 4.

Fig. 9 is a sectional view of the pump on the plane of the line 9—9 of Fig. 4.

Fig. 10 is a sectional view of the pump on the plane of the line 10—10 of Fig. 4.

Fig. 11 a sectional view of the pump on the plane of the line 11—11 of Fig. 4.

Fig. 12 is a sectional view of the pump on the plane of the line 12—12 of Fig. 4.

Fig. 13 is a vertical sectional view of the pump part of the apparatus, parts being broken away and foreshortened, the section being taken substantially on the plane of the axes of the pistons.

Fig. 13ᵃ is a front end view of the main steam valve casing.

Fig. 14 is a plan view of the upper or steam end of the pump, parts being broken away or omitted, and other parts being shown in section.

Fig. 15 is a plan view and section showing the right hand end of the reversing valve for controlling the main steam valve, the section being on the line 15—15 of Fig. 16.

Fig. 16 is a front view and section of the parts shown in Fig. 15.

Fig. 17 is a cross section taken generally on the line 17—17 of Fig. 16.

Fig. 18 is a cross section on the broken plane of the line 18—18 of Fig. 15.

Figs. 19 to 41 inclusive are more or less diagrammatic sections and details of the reversing valve mechanism shown in the various positions which they occupy at different times.

Fig. 19 is a longitudinal vertical sectional view of the reversing valves in the position which they would occupy when the right-hand piston is fully raised and the left-hand piston is fully depressed. It should be understood, however, that these valves remain in these positions during the time that the respective pistons are completing the intermediate succeeding strokes. This position for convenience will be termed the "first" position.

Fig. 20 is a vertical sectional view on the plane of the line 20—20 of Fig. 19.

Fig. 21 is a similar section on the plane of the line 21—21.

Fig. 22 is a plan view of the stationary or fixed valve seat and connecting passages, with the overlying valves removed, the flow of exhaust steam for the "first" position being indicated by arrows.

Fig. 22ᵃ is a sectional plan of the reversing valves taken slightly above the under surfaces and showing sections of ports and passages.

Fig. 23 shows the reversing valves in what may be termed the "second" position, where the left-hand piston has reached the top of its stroke and thrown its valve, and the right-hand piston is still descending.

Fig. 24 is a section on the plane of the line 24—24.

Fig. 25 is a section on the plane of the line 25—25.

Fig. 26 is a plan view of the stationary valve-seat and the registering connections for the "second" position.

Fig. 27 is a longitudinal, vertical, sectional view of the reversing valves in what may be termed the "third" position, where the right-hand piston has reached the bottom of its stroke, and the left-hand piston has not yet completed its stroke.

Fig. 27ᵃ is a section on the line 27ᵃ of Fig. 27.

Fig. 28 is a plan of the stationary valve seat and steam passages and indicates the flow of exhaust steam for the "third" position.

Fig. 29 is a vertical sectional view of the reversing valves in what may be termed the "fourth" position, the same being shown in Fig. 13, with the left-hand piston at the upper end of its stroke and the right-hand pistons at the lower end.

Fig. 30 is a section on the plane of the line 30—30 of Fig. 29.

Fig. 31 is a section on the plane of the line 31—31 of Fig. 29.

Fig. 32 is a section on the plane of the line 32—32 of Fig. 29.

Fig. 33 is a plan of the stationary valve-seat with passages, arrows indicating flow of live steam for the "fourth" position.

Fig. 34 is a longitudinal, vertical, sectional view of the reversing valves in what may be termed the "fifth" position, where the right-hand piston has reached the top of its stroke and the left-hand piston is still falling.

Fig. 35 is a section on the plane of the line 35—35 of Fig. 34.

Fig. 36 is a section on the plane of the line 36—36 of Fig. 34.

Fig. 37 is a plan of the stationary valve-seat with arrows indicating the flow of live steam when in the "fifth" position.

Fig. 38 is a longitudinal, vertical, sectional view with the parts in what may be termed the "sixth" position, where the left-hand piston has reached the lower end of its stroke and the right-hand piston is still rising.

Fig. 39 is a sectional view on the plane of the line 39—39 of Fig. 38.

Fig. 40 is a sectional view on the plane of the line 40—40 of Fig. 38.

Fig. 41 indicates the live steam passages with the valves in the position of Fig. 38.

Fig. 42 is a vertical sectional view of left-hand pump, also a filtering device and a low water float control.

Fig. 43 is a vertical sectional view on the line 43—43 of Fig. 44 showing the detachable filtering device.

Fig. 44 is a horizontal section on line 44—44 of Fig. 43.

Fig. 45 is a vertical sectional view of the upper or cold water end of the right-hand pump on the irregular section line 45—45 of Fig. 9 but with piston rod sleeve removed.

Fig. 46 is a vertical section of the cold water discharge valve on section of line 46—46 of Fig. 8.

Fig. 47 is a vertical sectional view of testing plug 55ᵃ.

Fig. 48 is a section at right angles thereto.

Fig. 49 is a side view and partial section of a single unit apparatus with a steam valve and passages, and a spray control mechanism shown in the high-speed or open position.

Fig. 50 is a front sectional view looking towards the locomotive cab, of a single unit apparatus, on the line 50—50 of Fig. 51 with details for controlling the water spray.

Fig. 51 is a plan view of pump and a partial section of the heater vessel of Fig. 49.

Fig. 52 is a plan view and partial section at top of pump on the plane of the line 52—52 of Fig. 49.

Fig. 53 is a sectional view showing part of the spray and pump control similar to that shown in Fig. 49 but on the slow-speed or closed position, when the heater pressure falls below a predetermined value.

Fig. 54 is a sectional view of an emergency low water control mechanism, on the line 54—54 of Fig. 5.

Fig. 55 is a sectional elevation of an improved form of filter box taken on similar lines to that of Fig. 43.

Fig. 56 is a sectional elevation of the same box taken on lines similar to Fig. 42.

Fig. 57 is a side elevation and part section of a single unit steam cylinder, receiver, and means for compounding the steam.

Fig. 58 is a plan of the same with the main valve partly broken away.

Fig. 59 is an end elevation and section of Fig. 5 on the line 59—59.

Fig. 60 is a sectional detail of the compounding valve in the high position with all pipes and ports shown in a single vertical plane.

Fig. 61 is a sectional detail of the compounding valve in the low position.

Fig. 62 is a side elevation and part section of a twin unit steam cylinder with the main steam valve in the right hand position, when used for compounding.

Fig. 63 is a top plan of Fig. 62 with a reservoir tank and required piping.

Fig. 64 is an end elevation and section of Fig. 62 on the line 64—64.

Fig. 65 is a plan of ports and passages under the main valve and showing the flow of steam when the valve is in the left hand position; taken on the line 65—65 of Fig. 62.

Figures 1, 2 and 3 of the drawings show the invention in one form as applied to a certain type of locomotive. It should be understood, of course, that this is merely illustrative of one particular use of the invention showing a typical installation and suggesting the manifold complicated problems involved in such a construction. The cold water supply is usually from a tank such as 1 carried by a tender. The boiler which is to be fed is indicated at 2. The exhaust steam which is used to heat the feedwater comes from the exhaust passages 3 and conduit 3ª. Substantially all the parts of the apparatus are designed to be accommodated below what is commonly termed the running board 4 along the side of the locomotive, the board being broken away in Fig. 2 to show the heater and adjacent air compressor. The heater tank 5 having an inspection door 5ª, is connected to the exhaust conduit 3ª by pipe line 6 containing a stop check-valve 7 and preferably an oil separator 8. Live steam for the pump 9 flows through pipe 10, while exhaust steam is carried away by pipe 10ª, having a check valve 19ª and a branch 17ª (with included check valve) connected to the heater vessel. Cold water goes to the pump through pipe 11 and hot water goes to the boiler through pipe 12.

The heater is preferably made of three parts for structural reasons. The back part 13 fits in under the side of the boiler, and the extension 14 provides additional vapor space and affords a connection for the end of the exhaust pipe line 6, as well as a housing for part of the regulating mechanism. With a standardized main section of tank 5, the back part 13, can be modified to fit various shapes of boiler, while the bonnet 14 can be varied to provide for any additional steam space required.

When the engine is drifting or at any time when the exhaust steam available from the driving cylinders is difficult, I provide an arrangement by which an auxiliary supply of exhaust steam may be supplied, for instance, from the air compressor 15. In this case the air compressor shown is what is commonly known as a cross compound air pump, although the type is immaterial to my invention. The auxiliary exhaust steam pipe 16 is connected to the heater by a branch 17 containing a check valve 18 preferably at or close to the heater. The pipe 16 may also have a check valve 19 located between the branch 17 and the stack. These valves are so adjusted that when the pressure in the heater is slightly less than that in the auxiliary exhaust line to the stack, the steam will pass into the heater while at other times it goes to the stack. The T 18ª in branch piping 17, is provided with a plug for a possible exhaust connection from other auxiliaries.

The cold water from the tank 1 is drawn through the pipe 11 by means of pump 9 and forced through pipe 20 into the heater. This pump may be a single cylinder or twin cylinder depending upon the space available and the capacity required. In the preferred form, I have shown the pump as having two pistons 21 and 22 arranged in suitable cylinders and adapted to be operated by steam pressure as will hereinafter be described. Each piston may be said to be single acting so far as the cold water is concerned and single acting with respect to the hot water. The cold water inlet valve-chamber is divided into two separated parts 23 and 24, each of which preferably contains a plurality of inlet valves 25 and 26, adapted to be lifted as the water flows into each chamber from below. Passages 27 and 27ª lead from the chamber 23 to the cylinder space 28 in which the piston 21 operates, 27ª also providing for the escape of entrapped air as shown on Fig. 46. A connector 29 has a conduit leading from the chamber 24 to the passage 30, leading to the cylinder space 31, in which the piston 22 travels. The entrance from the passage 27 into the cylinder space 28 is arranged through an annular channel 32. The passage 30 connects with the cylinder space 31 through an annular channel 33. As the piston 21 is depressed, water is drawn in through the valve chamber 23 and fills the space 28 above the piston. When the piston 21 rises the valve 25 is seated and the water is forced through a valve 34 preferably of the multiple beat type, and through a pipe 35 to the pipe 20, and thence into the heater. In a similar manner, when the piston 22 is depressed, water flows into the cylinder space 31 above the piston through the valve chamber 24 and conduit 29. When the piston 22 rises, the valve 26 is seated and the water is forced through the discharge valve 36 to pipe 37 to pipe 20 and thence into the heater. For convenience in construction and accessibility, the chambers 23 and 24 are provided with covers 38 and 39 held in place by bolts such as 40 on the outer rim and set bolts 41 on the inner rims.

To avoid shock at the upper end of the piston stroke I may provide each piston with a flange 42 and introduce a supplemental stationary flange 43 in the upper end of the cylinder, causing a restricted passage 44 to form when the flange 42 reaches the end of its upstroke (Fig. 13). As the water must escape through the channel 33, it is clear that any water which is trapped between the main part of the piston and the stuffing box 45 when the flange 42 fits over the stationary flange 43 can only escape by leakage. I provide passages 46 of limited area for this relief by which the resistance may be regulated and the speed near the end of the stroke correspondingly controlled.

The member 29 which carries the valve 36 is preferably a casting made separate from the cylinders for convenience in construction and assembly. The valve 34 is also preferably mounted in a separately formed casting.

As a part of the regulating system I prefer to provide a spray head 50 through which the cold water is discharged into the heating chamber. This head is preferably supplied with a series of spray openings to be described later on.

Above the spray head 50 I prefer to locate the deflecting or spraying member 51 (see Fig. 6) against which the water from the spray head strikes and is deflected laterally. I also prefer to provide one or more trays 52 at the sides. These trays serve not only to collect scales but they also serve to delay the fall of the water and thus give more time for the heating effect of the steam. The normal water level in the heater is below the spray head and the capacity of the heater is sufficient to insure proper supply of water to the hot water pump.

For convenience in construction, assembly, etc., the rear part 13 of the heater vessel preferably extends down below the rear of the main part 5 providing a trap or settling chamber in which I may introduce a baffle plate 53 extending below the inlet of the discharge pipe 54. This baffle tends to prevent floating material from passing out to the pump.

The bottom of the pump is formed by a casting 55 which is connected to the lower ends of the pump cylinders and to the discharge pipe 54. Test plugs 55ª of special design are inserted below each water valve as will be described later on.

Member 55 is provided with a horizontal valve deck 56 and a vertical web or partition 57 above the deck dividing it into a single lower chamber and two upper chambers both of which are provided with one or more hot water inlet valves 58 and 59. 56ª is a passage with plug to drain the hot water pump. The valves 58 and 59 are arranged directly beneath the respective pistons so that they control the inlet of hot water to the lower ends of their respective pump cylinders. This member 55 may be bolted or otherwise suitably secured to the lower end of the pump cylinders and constitutes a very convenient method of mounting the valves in such a way that they can be readily removed, inspected and replaced.

In order to save as much space as possible I prefer to form the attaching flange 60 on an incline and curve the lower end of the discharge pipe 54 as indicated in Figs. 4 and 6. It should be noted that the upper end of the discharge pipe 54 extends backward to the part 13 of the heater vessel. This construction permits a convenient installation and occupies a minimum of space.

Above the hot water inlet valves the pump cylinders are provided with lateral extensions 61, 62, 63 and 64 with water passages leading to the outlet valves 65 and 66. Cover plates such as 67 and 68 permit convenient access to the valves. The hot water drawn from the heater flows by gravity into the chamber below the valve deck 56 then past the valves 58 and 59 alternately and follows the pistons into their respective chambers when the pistons move upwardly. On the down stroke of the right hand piston 21 the hot water beneath it is forced upwardly past the valves 65 into a common chamber 69 above all outlet valves and to the top of which are fastened the covers 67 and 68. The outlet 70 from the chamber 69 delivers the hot water to pipe 71. This pipe 71 is connected to a fitting 72 which in turn is connected with pipe 12 which leads to the boiler check valve. To the fitting 72 I connect an air reservoir 73 which is located alongside of the heater vessel and beneath the extension 14. When the left hand piston 22 is depressed the hot water beneath it is forced past the valves 66 and into the chamber 69, outlet 70 and thence to the boiler.

In order to cushion the downward stroke of each piston I may extend the pump lining 74 downwardly and provide it with one or more openings or a series of openings 74ª leading to the lateral passages 61 to 64 inclusive. As the left-hand piston comes down, its lower flange gradually covers its openings 74ª and this increasingly restricts the total area of the discharge outlet. This piston flange 75 may be provided with one or more openings 76 to allow for the escape of air to opening 74ª. By recessing the casting 94 (Figs. 13 and 42) I provide space for the stuffing box 45 and at the same time avoid air pockets at the upper end of the pump cylinder, as it is lower than the top of the outlet 30, and cushioning means are established whenever there is a conjunction between the stuffing box and the piston on the up stroke. The lower flange 75 not only provides cushioning means on the down stroke but also makes a recess for the nut on the lower end of the piston rod.

It should be noted that by this system the pump handles a certain amount of cold water on the upper side of each piston and on the lower hot water side is obliged to handle not only the same quantity of water but also the condensed steam which has provided the heating medium, if the water level is to be maintained. I have located the power or steam cylinders 80 and 81 (Fig. 13) above the pump cylinders and connected the steam pistons 82 and 83 to the pump pistons 21 and 22 respectively by means of piston rods 84 and 85. Each piston rod is preferably threaded into its steam piston and bolted to the pump piston as shown in Figure 13. As a result of this general construction which is more fully described and claimed in my former application above referred to, the effective area of the lower, or hot water, face of each pump piston is materially greater than the cold water area, this excess being equal to the cross sectional area of the piston rod. Obviously the excess volume of water which can be handled by the hot water end of the piston is equal to the cross sectional area of the piston rod multiplied by the length of stroke of the piston. In order to make it possible to readily alter the ratio between the two effective faces of the piston I may make up the piston rod in two parts the outer part 86 of which constitutes a sleeve slipped over the inner part. By making the sleeve larger or smaller in diameter the ratio between the effective hot and cold water faces may be altered as desired. This sleeve while preferably loose fitting has several internal flanges 87 that act as guides for the inner rod and prevent lateral deflection. To prevent the sleeve 86 from carrying an excessive thrust and for which it is not designed, I provide yielding material such as at 88 for one or both ends, or otherwise pack to prevent leakage into the space between the piston rod and sleeve.

To accommodate the piston rod and various sized sleeves, I provide stuffing boxes 89 with a screw cap 90, having an inner flange 93 adapted to bear on a split gland 91 whose parts are doweled or otherwise secured together, and which can be removed and replaced with larger or smaller glands to accommodate various sizes of piston rods or sleeves.

Fig. 45 shows an adaptation of the same stuffing box and screw cup to the piston rod 84, when the sleeve 86 is removed. 86ª is a dotted outline of the maximum diameter sleeve for which the stuffing box is designed, while 91ª is a modified form of split gland made to fit the piston rod and wide enough at the top to receive the pressure from the screw cap's inner flange 93. To contain the smaller sized piston rod packing I have provided a removable split filler piece 92, suitably interlocked when in position.

The lower stuffing box 45 for the pump cylinder (see Figs. 13 and 42) is a modified form of the stuffing box 89. It may carry the flange 43 that fits into the upper cavity of the water piston 22, said flange forming a recessed interior with passages 46 for the escape of entrapped water when the pump is near the end of its upward stroke. These passages communicate with the annular space 33 and their combined areas can be modified to suit the speed conditions of the pump.

Inasmuch as the cold water is pumped into the heater at moderate pressures such as 20 to 40 pounds per square inch, while a greater volume of hot water must be forced into the boiler at a pressure perhaps of 200 pounds per square inch, I have provided means for regulating the steam pressure to suit these unequal conditions. In the twin or duplex pump unit, it is also desirable to provide for the operation of the pistons so that when one piston is forcing cold water into the heater the other piston will be forcing hot water into the boiler and vice versa. For convenience in construction and operation I prefer to provide a single main steam valve for controlling the admission of steam to the cylinders, being in turn controlled by supplemental or reversing valves operated by the respective pistons or piston rods of the two pumps. This main valve 95 in valve body 95ª cooperates with ports 96, 97 and 98 and is operated by the pistons 99 and 100 on the opposite ends of the rod 101 (see Figs. 7ª and 13). The adjacent faces of the pistons 99 and 100 are subjected to live steam pressure and, as the piston 99 is larger in diameter than the piston 100, the steam pressure tends to force the pistons in the direction of the larger one and thus to move the valve 95 so as to uncover the port 96 to the live steam, whenever the left face of piston 99 is not subjected to live steam pressure. The port 96 is connected to the upper end of the right-hand steam cylinder by a suitable passage 102 and through 102 to the lower end of the left-hand steam cylinder by a passage 103 in which is interposed a "reducing" check valve 104 of special design. With the main valve in the right-hand position as shown in Fig. 7ª, the live steam passes through the port 98, through the passages 105 and 105ª to the upper end of the left-hand steam cylinder above the piston 83, as well as to the lower end of the right-hand steam cylinder beneath the piston 82, thrugh a conduit 106 which includes a "reducing" check-valve 107 similar to the valve 104.

Each reducing valve is carried by a stem 108 and is adjustable up and down with a nut 109 on the stem. The stem rests by gravity and a spring if desired on the support 110 and the adjustment of the valve up and down on the stem varies the steam passage 111 beneath the valve. Valve 104 is shown in the high position, with passage 111 enlarging to passage 111ª. This valve throttles the live steam and tends to diminish the pressure on the underside of the steam piston to which that valve is connected. When the exhaust steam flows in the opposite direction however, it tends to lift the valve so as to permit a free exhaust.

With the main valve still in the same position, the combined exhaust steam from opposite ends of the cylinders passes through port 96, beneath the valve 95 and out the exhaust port 97 into pipe 10ª. When the main valve moves to the left as viewed in Fig. 7ª the steam from the boiler flows to the top of piston 82 and to the bottom of piston 83, reversing the pump action. At the same time the combined exhausts pass through port 98 to port 97 and then to the atmosphere or otherwise. The valve 95 or other parts within the cylinder or casing 95ª are located near the upper end of the right steam cylinder.

Live steam pressure is exerted at all times between the pistons 99 and 100. The outer face of the piston 100 is exposed to atmospheric or exhaust steam pressure. The outer face of the piston 99 is alternately exposed to live steam and exhaust steam pressure, and this alternation is controlled by auxiliary reversing valves operated by the main piston rods of the pumps. The main valve action is cushioned at both ends as will be understood later. These piston rods are preferably hollow and are provided with tappet rods 112 and 113 having buttons or flanges 114 on the lower ends. The piston 82 is provided with a plate 115 which engages the lower end 114 of the tappet rod 112 to pull it down. On the upward stroke of the piston the plate 115 engages the shoulder 116 to lift the tappet rod. The other tappet rod is operated in a similar manner, the rods 112 and 113 passing through stuffing-boxes in the cylinder head 117.

In the upper face of the cylinder head and, in an attached plate 118, acting as a valve seat for the reversing valves 119 and 120, are arranged a series of supplementary passages and ports. The reversing valves are operated by the tappet rods 112 and 113 respectively. The valve 119 has a slotted extension 121 pivoted to it at 122 (Fig. 16). It is held to its seat 118 by an adjustable spring 123, a screw 123ª, and a bearing 124. The extension 121 is guided between plate 118 and bridge 125 at the left, and in the bearing 126 at the right. The extension 121 has a groove or slot 127 in which a roller 128 carried by the tappet rod 112 is adapted to travel. The slot 127 has two vertical portions and an inclined connecting portion.

When the right-hand piston 82 moves upwardly and the plate 115 engages the shoulder 116, the roller 128 rises in the lower part of the slot 127 until it engages the inclined portion of the slot, which forces the valve 119 toward the left into a new position. As the piston and tappet rod continue to rise, the valve is held stationary during the movement of the roller 128 in the upper vertical end of the slot 127, thus providing a definite horizontal travel through a variable range of vertical play of the tappet rod. The left valve 120 has a slotted extension 129 guided in a manner similar to 121. The roller 130 on rod 113 travels in the slot in extension 129. The bearing 124ª on valve 162 holds 120 to its seat 118.

As the left tappet rod 113 is drawn downward by the piston, its roller slides downward in the upper vertical part of the slot without moving the valve. As it continues to move downwardly, the roller engages the inclined wall of the slot and forces the valve 120 toward the right to a new position. The continued downward movement of the tappet rod 113 brings its roller into the lower vertical part of the slot and holds or locks the valve in the extreme right-hand position. The extensions 121 and 129 are loosely hinged to their respective valves, so as to prevent any vertical play caused by the cam action in the slots, from being transmitted to the valves proper. The support for the roller 128 may have an extension pin 128ª (Fig. 15) guided in vertical slots to insure vertical movement and prevent possible bending of the tappet rod 112.

Ports 131 and 132 (Fig. 22) are connected to a passage 133 supplied with auxiliary live steam preferably from the main valve body 95ª. Port 134 is connected by a passage 135 and branches 136 and 137, to the outer or left end of the larger piston 99. A valve 138 preferably of the ball-check type is interposed in the branch 136 (see Figs. 13ª and 7ª).

When the piston 99 shifts to the left it covers the end of branch 137, and the remaining steam in the space to the left cushions the piston, as it cannot escape past the check valve 138. A reverse flow of live steam through passage 135, passes through the valve 138 into passage 136 and moves the piston 99 back to the right. A single passage at the right of piston 100 connects with the exhaust passage 97 and provides a reverse cushioning action. Exhaust ports 139 and 140 are both connected to exhaust passage 141. Ports 142 and 143 are connected by passage 144. Port 145 is connected to port 143 by passage 146. Ports 147 and 148 are connected together by passage 149 which in turn is connected to port 150 by passage 151. Ports 152 and 153 are connected by passage 154.

The valve 120 has a groove 155 adapted at certain times to connect ports 139 and 148 and at other times it blanks port 139. This valve also has two ports 156 and 157, which are adapted to register with ports 140 and 145 respectively when the valve 120 is in the right-hand position and also with the ports 148 and 140 when the valve 120 is in the left-hand position. This valve also has two ports 158 and 159 adapted to register in the right-hand position with ports 131 and 143 or when in the left-hand position with ports 147 and 131 respectively. The valve 120 also has two ports 160 and 161 which are adapted to register when in the left-hand position with stationary ports 153 and 145 respectively.

This slide valve 120 carries a rotary valve member 162 which reciprocates with it and is rotated or oscillated by means of a pin or roller 163 on the articulated shaft 164 coacting with cam members 165 and 166 carried by the right valve member 119 (see Figs. 15 and 17). The rotary valve 162 has a longitudinal groove 167 which is adapted to register with and connect ports 156 and 157 (Fig. 22ª et al.) when in one rotary position and to register with and connect ports 158 and 159 when rotated to another position by the pin and cam actions as will be later understood. This member 162 also has a circumferential groove 168 adapted at certain times to register with and connect the ports 160 and 161, when rotated.

The dot and dash lines 169 (on Fig. 15) with connecting arrows, show the travel of a point on the axis of the roller 163 during a single cycle, the various positions from the "first" to "sixth" being located with respect to the cam-wall, 165 and 166. The roller is shown in the "fourth" position. The right valve 119 has a transverse groove 170 adapted to register with and connect ports 132 and 152 in the bed plate when the valve is in the right-hand position. This valve 119 also has a longitudinal groove 171 adapted to connect ports 134 and 142 when the valve is in the right-hand position and to connect ports 150 and 134 when in the left-hand position.

When the right-hand piston is fully raised and the left-hand piston is fully depressed, the "right" reversing valve 119 is in its left-hand position and the "left" reversing valve is in its right-hand position as shown in Fig. 19 in what may be termed the "first" position. In this position, ports 131 and 132 are both blocked, and there is consequently no live steam passing through the reversing valves. The supplemental exhaust from the left-hand or front end of the main valve cylinder 95ª (Figs. 13ª and 14) is open at this time through the passages 137 and 135, port 134, groove 171, port 150, passages 151 and 149, port 148, groove 155, port 139, and passage 141 to the atmosphere or to any means for utilizing exhaust steam. This leaves the main valve free to be operated by the unbalanced steam pressure on the inner face of the piston 99 so as to shift the main valve 95 to the left (Fig. 7ª) and allows the live steam to pass through port 96 to the upper end of the right-hand steam piston and to the lower end of the left-hand steam piston through the passages previously described. The steam pressure then depresses the right-hand steam piston 82, and raises the left-hand piston 83 (the exhaust ports and passages from the steam cylinders being open as previously described).

When the piston plate 115 engages the button 114 on the lower end of the tappet rod 112, it pulls the tappet rod downward and the roller 128 acting in the inclined portion of the slot 127 shifts the valve 119 to the right and holds it there. At approximately the same time the left-hand piston rises and lifts its tappet rod 113 and its roller engaging in the inclined part of the slot in the extension, moves the "left" reversing valve 120 to the left-hand position. This may be termed the "fourth" position, at which time the steam passages are as suggested in Fig. 13 and in Figs. 29 to 33.

Here the supplementary live steam flows through the passage 133, port 132, groove 170, port 152, and through a passage 154 to port 153; port 160 in the left-reversing valve 120, groove 168 in the rotating valve member, ports 161, 145, thence through passages 146, 144, in the bed plate to port 142, then through groove 171 in valve 119, down through port 134 and out the passage 135 and branch 136 to the left-hand or front end of the main steam-valve piston 99. Pressure on the piston 99 moves the main valve to the right admitting live steam through the port 98 to the upper end of the left-hand steam cylinder through passages 105, 105ª and also to the lower end of the right-hand steam cylinder reversing each pump action, at which time, of course, the exhaust ports from the opposite ends of the steam cylinders are open for discharge.

On account of the varying conditions of operation the two pumps may not always operate in exact synchronism. For instance, in what may be termed the "second" position we assume that the right-hand piston is falling but has not moved far enough downward to shift its reversing valve, while the left-hand piston has moved to the upper end of its stroke and thrown its valve. This position is indicated in Figs. 23 to 26, at which time the supplementary exhaust from the main valve is open to the atmosphere through the valve passages as shown by the arrows;— the main valve remaining as before.

When the right-hand piston completes its downward stroke the parts are in the "fourth" position as indicated in Figs. 29 to 33 as previously described and the main valve will shift. In what I may term the "third" position illustrated in Figs. 27 and 28, the right-hand piston is assumed to be in the fully depressed position and its reversing valve is to the right, while the left-hand piston is still rising with its valve still to the right. In such a position the supplementary exhaust from the main valve is open as indicated in Fig. 28 and the main valve is still in the same place as shown in the "first" position.

In case the right-hand piston has reached the top of its stroke while the left-hand piston is still falling, the parts will be in what may be termed the "fifth" position as indicated in Figs. 34 to 37 which will naturally follow the above described "fourth" position. In this "fifth" position, supplementary live steam still continues to pass through the reversing valves to the main valve. In the "sixth" position the left-hand piston has reached the bottom of its stroke, while the right hand is rising (see Figs. 38 to 41). Positions 1, 2 or 3 require the small exhaust steam passages to remain open to the atmosphere, the live steam being cut off by the reversing valve actions. Positions 4, 5, or 6 require the exhaust passages to be cut off from atmosphere and the live steam to enter the large end of main steam valve through action of the reversing valves.

In passing from the "first" position to the "second" position, the "left" valve 120 moves to the left and carries with it the valve 162 and the pin or roller 163. At this time there is little or no rotation of the valve 162. This is also true in passing from the "first" to "third" positions. In going from "second" position to the "fourth" position or from the "third" to "fourth" position, the cam wall 165 forces the pin or roller 163 to rotate the valve 162 so that the circumferential groove 166 registers on its adjoining ports. When the roller travels from the "4th" to the "5th" position or from the "4th" to "6th" position, there is little or no rotation of the valve 162, and the parts register opposite each other as shown by Figs. 34 to 40. In going from "5th" position to "1st" position or from "6th" position to "1st" position, the valve 162 is rotated back to its original location by cam 166, the two valves 119 and 120 approaching each other, thus completing the cycle.

Occasionally the reversing valves may go directly from "1st" to "4th" position and will immediately reverse the main valve; also from "4th" back to "1st" position and again reverse the main valve. This happens when the two pumps arrive at the ends of their respective strokes simultaneously. Both "2nd" or "3rd" positions and "5th" or "6th" positions are to be regarded as intermediate ones and are designed so as to have no active effect on the main steam valve position.

It will be noticed that the ports of the valve seat 118 and the sliding valves 119 and 120 bear the same relation to one another in "2nd" as in the "5th" position though the "2nd" position allows escape of supplementary exhaust, while the "5th" position should require the escape to atmosphere to be cut off and live steam to take its place. A similar condition occurs in the "3rd" and "6th" positions, and so the rotating riding valve 162 had to be added to correct this difficulty.

By the foregoing construction it will be seen that although the two pump pistons are not mechanically connected they are caused to operate with substantial synchronism.

When the exhaust steam pressure from the locomotive in the heater falls off for any reason, there may be insufficient steam to heat the injected water to the desired temperature. To meet this condition I provide means for slowing down or stopping the pump. This may be accomplished in several different ways. For instance I may provide in the power line 10, leading to the pump, one or more governors 175 of the pressure regulator type, each being adjusted to operate at a different pressure. This governor may be so designed and adjusted as to shut off the steam supply flowing to the main valve when the heater pressure drops below a predetermined amount. Steam pipe 176 connects the governor with the top part of the heater vessel.

As soon as the heater pressure rises so as to supply the proper amount of steam, the governor 175 opens up the steam line 10, and the pump resumes its former speed. A by-pass 177 around the governor may be provided to permit the pump to run at slow speed even when the governor is closed, so as to keep all moving parts under a slow control. This by-pass may be controlled by a valve 178.

It may be desirable to provide an indicator located in the cab so that the engine man can know when and how fast his pump is working. For this purpose I connect an indicator 178ᵃ by a pipe with the cold water discharge at some point such as between the pump and the spray device. A check valve 179 may be provided if desired to prevent water from flowing back from the indicator. A pet-cock 180 may also be installed with suitable means to carry off any water that runs to waste. An adjustment of the discharge from the pet-cock will provide a partial cushion against water hammer, and allow a slight recession of the indicator before the start of the next stroke.

To prevent the heater from becoming air bound, there may be a steam outlet controlled for instance by a pressure relief valve 181, Figs. 5 and 51, through which air and steam may be allowed to escape whenever the pressure gets above a predetermined value. To condense externally as large an amount of this steam as possible and at the same time recover some of the exhaust heat, I use this steam to heat one or more of the cylinders by discharging into the jacket spacing 182 (Figs. 49 and 51). In any even the final exhaust from the outlet 183 and controlled by the valve 184, should be led to some place such as the ash pan where the condensation will not be in the way, and where the excess escaping steam may not be troublesome.

The float 185 (Figs. 6 and 6ᵃ) in the heater reservoir operates a valve 186 which controls the passage of water through pipes 187 and 188 between the upper ends of the two pump cylinders as shown in Fig. 9. When the water level rises to a predetermined height, the valve 186 opens and allows cold water to pass back and forth from one pump to the other through the pipes 187 and 188 thereby reducing the amount of water to be pumped into the heater vessel.

An air vent 189 at the top of valve 186 collects entrained air, opening into the heater vessel only when the connection between pipes 187 and 188 is cut off.

In case the water level in the heater falls too low I may desire to decrease the withdrawal until the level rises again. For this purpose I may provide a hot water by-pass 190 (Fig. 42) leading from the hot water side of the pump up into the heater. This is controlled by a valve 191 which is normally kept closed by a weight 192, lever 193 and cam or eccentric 194 bearing on the upper end of the valve's projecting stem. The float 195 when it falls tilts the lever 193 and the eccentric 194 and allows the water pressure from the pump to lift the valve 191 and by-pass hot water back to the heater vessel at each discharge. Between the pump strokes, the weight of the valve or a spring tends to seat it; any movement of the eccentric at this period being unopposed and locking or wedging the valve travel for the following stroke.

The apparatus is designed so as to maintain as constant a water lever as possible, in the heater. To accomplish this I may provide a valve controlled hot water by-pass 196 (Figs. 6 and 11) between the two hot water ends of chambers of the pumps so as to pass some of the hot water discharge from one pump chamber to the other one, thus lessening the amount withdrawn from the heater. This may be used to decrease the ratio of hot water to cold water pump delivery.

It will be seen that this control allows an adjustable percentage of the hot water discharge to pass from one hot water pumping chamber to the other and vice versa whenever the pumps reverse their strokes. A somewhat similar by-passing is used at the ends of the cold water pumps. The term pumping chamber is here applied to that space between the pump piston and its related valves.

For an emergency low water control of the water level in the heater vessel I may provide a float 197, a lever arm 197ᵃ and a water valve 198 in a casing 199 and connected to the cold water conduit 20 by port 200 and also to the spray head 50 by the port 201, (see Figs. 5 and 54). The valve 198 is of the two piston type and somewhat similar in action though of reverse direction to the valve 232 (to be described later on). The lever 197ᵃ and float 197 are free of one another and only co-act when in the low position shown in Fig. 54.

When the float 197 is in this low-level position its effective weight acting through the lever 197ᵃ raises the valve 198 and closes the port 201, thus cutting part or all of the water from the spray-head and causing the pump to slow down or come to a stop. When the float rises, the valve 198 will sink by its own weight, thus uncovering the port 201, and permitting water to flow from port 200 to port 201 and thence through the spray head 50 into the heater. The valve 198 is balanced against external and internal pressure and is free to move. This slowing down of the pump may be registered in the cab by the indicator 178ᵃ and action taken accordingly.

While open heaters of the stationary type make excellent water purifiers when employing scale-collecting trays and porous material through which to filter the heated water, the filtering process requires comparatively large receptacles or frequent removals and cleanings of the filtering substance. To solve this problems on locomotives in districts where the feed water supply is particularly bad, I have designed one or more detachable filter boxes, that can be removed from the heater vessel when necessary and replaced by clean boxes without the speed or action of the feed pump being affected; the removed boxes being replaced by others and cleaned at the end of the trip or otherwise.

In Figs. 42, 43 and 44 is shown a partition with a vertical portion 202 and a horizontal portion 203. It divides the lower part of the heater section 13 into two parts 204 and 205, the first being open to the rest of the heater while 205 is shut off by said partition. An opening 206 connects 204 and 205 at times but is normally closed by a door or shutter 207. This shutter may be revolved to close 208, thus opening 206 permitting a direct flow of hot water to outlet 54. At such a time shutter 214 should close 209. The filter box 210 is detachably secured to the heater vessel and has openings to correspond with 208 and 209.

This box 210 has an inclined perforated partition 211 and a vertical partition 212, perforated near the top and dividing it into four compartments. Normally the hot water in the heater as shown by the arrows passes into chamber 204 thence through opening 208 up and through partition 211 and the filtering medium 213, through the top of partition 212, down through partition 211, back through opening 209 into chamber 205 and out through pipe 54 to the pump. To remove the filter the shutters 207 and 214 are closed against the openings 208 and 209. This leaves the communicating passage 206 open for the direct discharge of hot water to the conduit 54 without any interference with the pumping action.

The three-way valve 216$^a$ permits the pressure to be equalized between the heater vessel 13 and the filter box. By turning the valve the heater may be shut off and the filter box connected direct to the air. To drain the filter the plug 215 is opened. When the filter box is removed, the clapper 216 falls and closes the opening through which one of the outlets of the valve 216$^a$ has extended.

The filtering material may also be provided in a container 217 such as shown in Figs. 55 and 56 through which hot water passes substantially as above described in the references to Figs. 42 to 44. The filter box 210$^a$ in which the container fits is a modified form of 210, but with a detachable top through which the container can be introduced. A seat 217$^a$ supports the container 217. This container 217 is divided into two chambers, the water entering the bottom of one, flowing up and over to the other, then down and out the bottom through the shutter controlled openings and to the pump, following the arrows and in the general manner also shown in Figs. 42, 43 and 44.

The container rests on the seat 217$^a$ in which are holes that permit the two bottom parts of the container to extend into the space below, perforations in these bottom portions permitting the flow of water through them but retaining the filtering material. An air vent and valve can be placed between the heater vessel and top of the filter box. An excess upward pressure on 217, due to the filling or clogging up of filtering material, may cause it to rise from its seat 217$^a$ the hot water by-passing the filter and flowing back through the return opening in the heater and thence to the pump, thus at all times allowing a sufficient hot water supply.

To provide an easy means for testing the numerous water valves, so as to determine the strength of springs, lift of valves and proper seating, I have designed a screw plug 55$^a$ to be inserted in the metal below each valve (see Figs. 47 and 48). Each screw plug has one or more small openings 218 closed by plugs or caps 219 on the underside to prevent escape of contained water. An elastic or yielding material 220 is suitably attached to the top side of each plug. These caps 219 may be carried by a rotatable piece 221 and are swung out of the way when revolved.

The testing fork or pin 222 is to be inserted freely through openings 218 and forcibly through the elastic diaphragm 220, so as to engage and lift the valve above it, the operator judging of each valve's condition by the lift and feel of the introduced pin. This elastic material should grip the testing pin sufficiently to prevent an excess of water from escaping during the test. At other times the caps 219 close the openings 218 and are kept in place by a screw or other device, the elastic material not being required to function. The underside of the plug is shown recessed so as to contain 221 when 219 closes opening 218.

As the steam in the heater will frequently fall below the pressure necessary to force the hot water through the suction valves at the velocity that the high speed stage of the pump requires, I propose introducing a restriction in the cold water passages leading to the heater, thereby reducing the pump speed, and requiring less velocity of hot water through these valves. This pump speed can then be adjusted by varying the restriction, two or more speed stages being used. The following speed control while applicable to both single and twin unit pumps, is shown in detail on the drawings of the single unit pump and heater Figs. 49 to 54 inclusive.

Cold water from the pump passes through conduit 223 and float valve 223$^a$, to the spray head 224, a by-pass 224$^a$, connecting valve 223$^a$, and the cold water inlet, to the pump. This sprayhead has a number of small outlets discharging upwardly and assembled in two or more groups, separately controlled. A high water float 225 traveling in a guard or guide 225$^a$, to protect it from water surging, operates the valve 223$^a$ through the lever arm 226. Three groups of spray outlets such as 227, 228 and 229 are shown, the number or sizes of these outlets in each group varying to meet the required speeds of the cold water pump. Cold injection water passes from conduit 223 to the spray head through ports and passages as described below.

Within the heater chamber is a single acting piston 230 with a water space or seal 230ª, operating in a cylinder 231. The double ended water piston valve 232 which operates in an open ended cylinder 233 is connected by a lever 234 to the steam or pressure piston 230. The cylinder 233 has an inlet port 235 to which the cold water inlet pipe 223 connects. It also has outlet ports such as 236 and 237 leading to the sprayhead 224. In the form shown, the port 236 leads to the group of spray outlets 228 and the port 237 leads to the group 229, while the group 227 is at all times connected with 223. When the movable parts are in the position shown in Fig. 49 the cold water passes through the passage and port 235 into the cylinder 233 and through the ports 236 and 237 to the spray openings 228 and 229 respectively, as well as some of the water going directly from 223 to the spray openings 227, this being the high speed stage.

When the exhaust steam pressure falls below a certain pre-determined amount, the weight of the valve 232 and any supported part such as the weight 238 will be sufficient to over balance the steam pressure on the piston 230, the valve 232 falling until the weight 238 rests on valve body 233 thus closing the port 237. Water will then continue to flow through the port 236 to the spray outlet 228 (as well as through 227). When the exhaust steam pressure falls below another predetermined point, the weight of the valve 232 and parts will be sufficient to lower the valve still further until the port 236 is closed, thus cutting out the spray outlets 228, and leaving only the spray outlets 227 in operation. This is the slow speed stage as shown in Fig. 53. The number and size of outlets or orifices in 227 will determine the slow speed of the pump.

The piston 230 is, of course, exposed inside the heater chamber to the exhaust steam pressure, while on the underside it is open to atmospheric pressure; for instance, through a hollow stem or guide 239. The water valve 232 is exposed at its upper and lower ends to the pressure within the heater chamber, and is exposed at both of its interior faces to the water pressure from the pump, so that the valve is balanced and free to take up such position as its weight and the steam pressure on the piston 230 determine. When the heater pressure again rises, the ports 236 and 237 successively open until the spray head again receives its maximum supply of water.

In my construction I may arrange some of the outlets of the spray-head such as in row 240 below the level of the others, so that in case the hot water in the heater rises above these lower spray outlets they will be covered, thereby decreasing the spray effect from these lower outlets, reducing the condensation automatically and giving the hot water pump a chance to get rid of the excess water in the heater.

A horizontal extension 241 to the fulcrum support is shown on Fig. 53 and may be provided with extra holes that match corresponding ones in lever 234 permitting a shifting of the fulcrum and a change in the ratio of the lever arms. By adding an extension piece 242 to the lever arm 234 (shown only in Fig. 49) it may be made to engage some part of the float 225 or an extension of the lever arm 226, but only when the float is in a low or emergency position. At that time the unsupported weight of the float and attached parts may be used to depress the water valve 232 and thereby slowdown or stop the pump. A rise in water level will release valve 232.

Many of the foregoing features of construction and regulation may be applied to the single unit pump as set forth in my former application. Many of the details of single unit construction as illustrated in Figures 49 to 52 closely follow the general construction of the twin unit previously described. The hot water by-pass 243 in this case may have a valve and serve to transfer some of the hot water from the top side of the hot water suction valve 244 to the bottom at convenient points. In addition to this hand controlled by-pass I may employ an automatic float controlled by-pass similar to the hot water by-pass 190 (Fig. 42). In this case, of course, the automatic valve should open only when the water falls below a certain level. 245 is a spray deflector. 246 shows a scale collecting tray and 246ª is a baffle plate at the entrance to hot water conduit 248.

Cold feed-water enters from pipe 11 passing through inlet valve 247 to upper end of pump cylinder. During the reverse stroke it passes out through a multiple-beat discharge valve 247ª, through conduit 223, and to the spray head. Hot water is withdrawn from the heater vessel through conduit 248 passing through inlet valve 244 to the lower end of the pump. On the reverse stroke the hot water passes through the discharge valves 249 and conduit 249ª to the pipe 12 and thence to the locomotive boiler. 2 and 4 show a section of locomotive boiler and running board.

The main steam valve 250 is contained in the body 251 attached to the cylinder top, being similar in action to the twin unit type, but governed by a single reversing valve located in casing 252 and operated by a tappet rod 253 broken away at the upper end. 254 is a reducing check valve in the steam passage to bottom of the steam cylinder similar to 107 of Fig. 7ª. The construction of the heater vessel is similar to that of the twin unit type, and the pumping action of this single unit is similar to that shown in my patent application of March 1st, 1921

In connection with this single unit type I have also shown an arrangement for compounding the steam when operating this pump (see Figs. 57 to 61). In this case the main steam valve 255 may be controlled in a manner similar to the valve 250, though it has one more steam port to control. It has two grooves adapted to register with ports 256, 257, 258 and 259. In the right hand position as shown in Figs. 57 and 58 high pressure steam is escaping from the upper end of the cylinder through passage 260 and through ports 256 and 257 to passage 261 and piping to port 262 in the compounding valve 263. At the same time lower pressure steam from the receiver 264 passes through pipe 265, valve 266, passage 267 to port 259.

Passing from 259 to port 258 it flows through passage 268, which connects with the bottom of the cylinder causing the piston to rise, as soon as the high pressure steam at the upper end of the cylinder has escaped. Meanwhile the high pressure exhaust passes through port 262 into the interior of valve 263 between the inner faces of the double ended steam piston 269, a by-pass 270 maintaining an equal pressure on both sides of the lower end of piston 269. Should the piston 269 be in the low position shown in Fig. 61 at the beginning of the up-stroke, the steam will escape through port 271, pipe 272, regulating valve 273 and piping 10$^a$ to the atmosphere. By a partial closing of the valve 273, an unbalanced pressure will be exerted upward on the bottom face of the double piston 269 causing it to rise and assume the position shown in Fig. 60 uncovering the port 274. High pressure exhaust then passes through 274, pipe 275, check valve 276 into the receiver vessel. Port 271 is now closed by valve 269. Pipe 277 will maintain the same pressure on top of valve 269 as occurs in the receiver. When the increasing receiver pressure nearly equals the decreasing exhaust pressure, as carried to bottom of valve 269 by passage 270, the double piston valve 269 is nearly balanced, and a spring 278 causes the piston to drop again to the position shown in Fig. 61. The remainder of the high pressure exhaust now passes through port 271 and piping 272 to the atmosphere as previously described.

On the pump arriving at the top of its stroke, the main steam valve shifts to the left, admitting live steam through port 256 to the top of the cylinder, while the low pressure exhaust from the bottom end passes from port 258 to port 257, passage 261, to the compounding valve 263 and port 271 and pipe 272 to the atmosphere. As the pressure in the receiver will be greater than the low pressure exhaust, there will be no rising of the valve 269 during this time.

It will thus be seen that the high pressure steam is available for depressing the pump piston and forcing hot water into the boiler, while the reduced pressure or a part of the high pressure exhaust steam is available for forcing the cold water into the heater. The tappet rod 253 operates a reversing valve that admits supplementary steam to the main steam valve, and shifts this valve in the same general manner as is used with the pump shown in Fig. 48.

In compounding the steam for a two cylinder or twin unit pump, operated by a single main steam valve, I have used the same type of auxiliary reversing valves, as shown on Fig. 13. On account of the extra long main steam valve required, I prefer to locate it on the cylinder head, as shown. Fig. 62 shows a partly broken vertical section along the axis of the main valve and an irregular or broken section of parts of the two cylinders on the same or parallel vertical planes. This valve 281 in the valve body 282 is in the right hand position and its three grooves register on, or control the seven ports as is shown. Fig. 63 is a general top plan of twin cylinders, piping and receiver, with part of the main valve body broken away, and the valve removed so as to uncover the seven ports. Fig. 64 is a side elevation of Fig. 62 on the section line 64—64.

Commencing the pumping cycle, the right hand steam piston is at the lower end of the cylinder and ready to start upward, while the left hand piston is at the top and ready to start downward, the main steam valve being set for this action. This shows the "fourth" position. Heavy arrows 283 show the flow of "high-pressure" live and exhaust steam that operates in the upper ends of both cylinders, while dotted arrows 284 indicate the action of the "low-pressure" steam supplied by the receiver vessel and the subsequent exhaust from the bottom of each cylinder.

Low pressure steam from the receiver 285 flows through piping 286, regulating valve 287, upper low-pressure passage 288, through passage 289 to port 293. The seven steam ports 290, 291, 292, 293, 294, 295 and 296 are shown. Dotted arrows show the flow of steam to the bottom of right cylinder and also the low pressure exhaust from the bottom of the left cylinder. At the same time, high pressure steam enters the valve body through the pipe 10, full arrows showing its flow to the top of left cylinder and also the discharge of high pressure exhaust from the top of the right cylinder. Both high and low pressure exhaust pass through the same exhaust pipe 10$^a$ to the atmosphere.

Port 290 is connected by passage 297 to the top of the left hand cylinder, port 291 by passage 298 to outlet 299, port 292 by passage 300 to the bottom of left cylinder, port 293 to passage 289 and 288 to low pressure piping 286, port 294 by passage 301 to the bottom of the right hand cylinder, port 295 by passage 302 to outlet 303, while port 296 connects by passage 304 with the top of the right cylinder. The outlet 303 connects to pipe line 305 having a check valve 306, thence to a cross fitting 307, connected to the exhaust steam line 10ª through a regulating valve 308. The outlet 299 connects to cross 307 with interposed check valve 309. Cross 307 also connects to receiver 285 by piping 310 and interposed check valve 311.

Supplemental steam passages from the reversing valve set 312, lead to the main valve body 282 and may operate the valve 281 in the same general manner as described for the simple twin unit pump. The receiver can be located within convenient piping distance. Fig. 65 is a plan on section 65—65 of Fig. 62, with arrows that show a reverse flow of steam as compared with Fig. 63. It is to be understood that the main steam valve has shifted to the left when the arrows are registering as shown in plan Fig. 65.

When the pistons have reached the ends of their strokes the main steam valve will move to the left and reverse the action of the respective pumps. The arrows 283 and 284 in Fig. 65 show the new flow of steam. At the end of this stroke the pump will have returned to the "first" position and completed its cycle. At the beginning of each exhaust the high pressure exhaust will momentarily block the low pressure exhaust while supplying the required steam to the receiver, but this means only a slight cushioning at the beginning of each high-pressure downward stroke. The maximum pressure in the receiver will be determined by its size, together with the amount of restriction caused by the valve in the atmospheric exhaust pipe 10ª, while the low pressure supply from the receiver 285 can be regulated by the valve 287.

It will be seen from the foregoing descriptions that I have designed apparatus that takes cold feed water and forces it into a heating chamber, often against an exhaust steam pressure that may vary from atmospheric pressure to ten or twelve pounds to the square inch. The water from the condensed steam may vary from nothing to 15 or 18% of the total amount required for boiler consumption. The use of a cold water injection pump and a hot water feed pump in substantial synchronism seems to be imperative, thereby assuring a major stabilization of the hot water contents of the heater vessel, my hot and cold pump supplying this feature.

A minor stabilization is also required to allow for variations in the quantity of water of condensation, and the use of some form of reliable float control seems essential. Not wishing to continually by-pass the 15 to 18% of condensation back to the source of supply by means of a float action, I diminish the cold water pump contents perhaps as much as 10 or 12%, by using a large piston rod or sleeve in the cold water end, thus leaving about 5% excess cold water to be handled by the float.

By removing packing and parts of the adjustable stuffing boxes, as well as the pump piston, the piston rod sleeve can be easily removed through the bottom of the pump, and a sleeve of different diameter substituted, together with its corresponding stuffing box gland, as already described, thereby altering the previous volumetric ratio of hot and cold water pumps. A temporary alteration of this ratio can be made by operating the valve in the hot water by-pass at the bottom of the pump. Should the exhaust steam supply temporarily fall off, a reserve of hot water in the heater vessel can be drawn on. My auxiliary supply of exhaust steam and the automatic slowing down of the pump, can also be depended upon to meet these temporary conditions.

For instance the pump might be working at full capacity (say at the highest practical piston speed) and against a locomotive exhaust pressure of 10 pounds per square inch. Should this pressure suddenly drop to two pounds it might not be sufficient to force the water into the hot water pump at a rate necessary to keep it in contact with the rising piston. To rectify this, the governor in the live steam line to the pump can be adjusted to shut off the steam whenever this pressure is reached. The by-pass around the governor can be regulated so as to keep the pump at the slow speed required for the reduced pressure head in the heater, thus giving a high speed and a slow speed control. An intermediate speed may be also introduced by the addition of another governor adjusted to close at a different pressure.

In conjunction with this governor control or possibly as an alternate control I may use the regulating device that is shown attached to the spray head. Adjusted to remain wide open at any heater pressure, say above two pounds, it would shift to an intermediate stage at two lbs. and interpose enough resistance in the remaining spray outlets to reduce the upward pump speed to that determined by the hot water inflow. A further pressure reduction to ½ or 1 pound per square inch would further slow down the pump to a minimum speed or bring it to a full stop, as might be desired.

These pressures in the heater may vary considerably and are assumed merely for the sake of illustration. At one of the latter speed-stages, the pressure in the auxiliary exhaust line could be used to open the check valve leading to the heater, and a supply of steam that would properly heat the quantity of water required for the new speed, would enter the heater vessel.

On the return of sufficient steam from the locomotive exhaust, the pressure would rise, the auxiliary check valve would close and the pump speed would adjust itself to that permitted by the pressure, all this occurring without any attention from the engine-man. He can at any time slow down the pump but cannot speed it up beyond a rate justified by the exhaust steam supply.

It has been determined that about 15% of the exhaust steam is sufficient to heat to boiling point the water entering the locomotive boiler and replacing the steam used. Recent tests on freight train movements have shown that the average steam consumption of the air-pump is 10% of the locomotive's steam output. Assuming a minimum consumption of 5%, then this air pump exhaust would be 1/3 of the 15% required by the heater at full capacity, and therefore would only properly heat 1/3 of the amount of water required when the locomotive was under full steam. But at the time this 5% air-pump exhaust is being used, the locomotive is "drifting" and does not require as much feed water. Therefore, by adjusting the automatic resistances of the feed pump so as to slow it down to 1/3 the former speed, all the feed water supplied will be heated to the maximum temperature, substantially by the air pump alone.

To require a static head of hot water to give the maximum flow through the suction valves would necessitate a heater tank of greater height than conditions warrant. It is, however, allowable to depend on the exhaust steam pressure to give a greater part of this head and so keep the apparatus within moderate vertical limits. On the cessation of this pressure however the hot water will not follow the pump piston sufficiently on the up stroke, and a disastrous "hammer" may occur at the beginning of the following down stroke. This I can prevent by my "pressure-speed-control" as previously described.

It is essential to a well balanced operation of a locomotive feed water heater that an auxiliary supply of exhaust steam should be at hand. But these auxiliaries should have a comparatively free exhaust and not be compelled to work against excessive back pressure. Therefore it is not expedient for them to exhaust directly into a heater vessel against a possible back pressure of ten pounds or more. My solution of this problem lies in a double exhaust discharge for the auxiliary, one to the stack or atmosphere and one to the heater, with check or regulator valves placed substantially as shown in the various drawings. Very little pressure on the check valve nearer the heater is required to open it, as it can be lightly balanced, being introduced in the pipe line to prevent possible heater pressure from backing up into the auxiliaries.

Another advantage of my branch connection between the auxiliary exhaust line and the feed water heater, preferably leading upward, lies in the small amount of oil that will be carried through this pipe. Exhaust steam passes through this pipe infrequently and when it does, the small amount of oil will be retarded and collected in this branch, dropping back into the lower portion of the piping, a vertical flow through a larger sized pipe making an effective oil separator.

A rapid method of inspecting all water valves at the beginning of an engine's run, reduces the chances of a failure of the pump during that run, while the proposed high and low water emergency controls will prevent breakdowns due to the possible pounding of the pump. However, any shut down during the run would call for the injector that would usually be regarded as a standby.

It will be noticed that the relatively high position of the heater vessel and its shape, permits the ready attachment of filter boxes of various sizes to meet different conditions, as well as accessibility for adjustment, cleaning, removing, etc. This design allows all the parts of the apparatus to be readily drained through a minimum of easily removed plugs in their respective openings. Bracket supports from the side of the boiler, similar in construction to that carrying the air-compressor, are to be provided.

The twin pump unit has been kept well within the outside dimensions of the 8½ inch cross compound air-compressor, but preferably suspended from the locomotive as low as is allowable. The heater vessel has been designed so as to use thin boiler or tank iron, with a minimum of joints, but with necessary flanges bent inwardly for contact surfaces at joints, as well, as for structural stiffening. Most of the hot water reserve supply is kept well above the hot water pump where it will give the proper head to lift the suction valves, only a conduit of moderate diameter connecting with the hot water pump. The steam space is designed to be sufficient to heat the cold spray and to assist in the collection of scale from the water, the same tending to form on any exposed metallic surface that the heated water passes over.

It has hitherto been deemed advisable to install any proposed feed pump and heater on the left side of the locomotive boiler, as the line of vision on the right side must be kept entirely clear for the engineman. I have shown all my designs with this point in view. In recent constructions however, one and both of the cross compound air-compressors have been placed on the right side.

As my heater apparatus is no higher than these air compressors and can be installed below the running board, a better balanced assembly might be made by placing my heater on the right side of the locomotive where it could be kept nearer the cab and also would permit better cold water piping connections.

The spray head 50 (Fig. 5) is shown in combination with the low water control, as illustrated in Fig. 54, the "speed-control" being supplied by the steam governor, 175. By allowing some part of the high water float 185, or its lever arm at times of low water, to depress the lever arm 197$^a$, the float 197 may be eliminated, the other float 185 functioning in its place.

When the other spray head 224 (Fig. 51) with the attached "control mechanism" shown in Fig. 53 is to be used, the emergency low water control of Fig. 54 may be employed separately, with its individual float 197, or the simplified combination shown in Fig. 49 may be used. By attaching the extension arm 249, as before described, the high water float may be employed at times of "low-water" to depress the lever arm 234 and bring about successive reductions of piston speed. In this case, the entire assembly shown in Fig. 54 may be dispensed with, and a single float and control as shown in Fig. 49 may be used.

Thus at times of high water, the float action by-passes any excess cold water back to the pump, while at extreme high water, a part or all of the spray orifices are covered and the condensation may become nothing. The spray orifice control is wide open at times of high pressure and nearly or quite closed when the heater pressure falls sufficiently. When the low water stage is reached the spray control will be nearly closed, irrespective of the steam pressure, thereby slowing down the pump and, though released on the return of high water, it will not open unless the heater pressure permits it.

It will be seen that there are here employed three interlocking and yet partly independent water controls, the most important function of each one not being interfered with by the other two, while all three co-act properly with one another. This combination is simple in action and construction and there is only a minimum chance of break down or failure. These three, in conjunction with the passive one of extreme high water control, constitute an almost perfect safeguard against the flooding or emptying of the heater vessel, which is ever threatening to occur during the locomotive run. The twin unit design shows the two pumps as one casting, with the cold-water inlet, and the hot water discharge valve chambers, cored into the casting, giving a very compact assembly of parts. By the employment of vertical boring-bars with attached cutting tools of proper design, the valve seats may be fitted into place and the joints for the cover plates bored and faced to make a tight connection. It will be observed that the upper portions of the pump do not interfere with the machining of the lower valve chambers, in this design. To provide a proper width of contact surface for the cover plates, it may be necessary to slightly undercut into part of the outer wall of the pump cylinder on account of the narrow restrictions imposed. This loss of material can be made up by the addition of extra metal near by, the total strength of the casting remaining the same.

For the purpose of better defining my descriptions and claims, I use the phrase "excess cold water" to apply to that portion in excess of that required to keep the water level normal. The term "deficit hot water" is intended to apply to that portion of the hot water that would tend to lower the water level if permanently removed from the heater vessel.

I claim:

1. In a feedwater heater, a heater vessel, a spray-head having a plurality of outlets, one or more being at a lower level than the remainder, a pump for forcing water through said outlets into said heater vessel and for withdrawing hot water from said vessel, the lower spray outlet or outlets serving as an emergency high water regulator to reduce the condensation in the heater vessel.

2. In a feedwater heater, a heater vessel, a spray-head therein having a plurality of sets of spray outlets, means controlled by the steam pressure in the heater vessel for closing some of said outlets.

3. In a feedwater heater, a heater vessel, a spray-head having a plurality of openings, and means controlled by the action of the steam in said vessel for successively opening and closing a plurality of said openings.

4. In a feedwater heater, a heater vessel, a steam operated piston therein, a spray-head, a valve for admitting water to said spray-head, and a connection between said piston and said valve.

5. In a feedwater heater, a heater vessel, a steam operated member therein, a spray-head having a plurality of openings and a valve connected to said steam operated member for successively controlling a plurality of said openings.

6. In a feedwater heater, a heater vessel, a steam operated member therein, a spray-head, a slide valve for controlling a plurality of connections to said spray-head, and a weight adapted to move with said slide valve through part of its range of movement and to be disconnected from the slide valve through part of its range of movement.

7. In a feedwater heater, a heater vessel, a spray-head therein having a plurality of outlets, some of which are in a plane below the level of others whereby they are adapted to be submerged in an emergency.

8. In a feedwater heater, a heater vessel, a spray-head therein having a plurality of outlets, some of which are in a plane below the level of others whereby they are adapted to be submerged in an emergency, and means controlled by the steam pressure in said vessel for varying the discharge from some of the remainder of said openings.

9. In a feedwater heater, a vessel heated by exhaust steam, a pump connected to said vessel, and means for varying the flow resistance of the cold water from the pump in inverse proportion to the exhaust steam pressure in the heater vessel.

10. In a feedwater heater, a heater vessel, two single acting pumps with valve connections to said vessel and to the boiler whereby when one pump is delivering cold water into said vessel, the other pump is delivering a greater quantity of hot water into the boiler at one half of the cycle and at the same time said pumps respectively are filling with hot and cold water.

11. In a feedwater heater, a heater vessel, two pump pistons alternately feeding cold water to said vessel and drawing hot water therefrom to force it to the boiler, and a hot water by-pass connecting said pumps and allowing the flow of hot water in both directions under certain circumstances.

12. In a feedwater heater, a heater vessel formed in three parts, one part having openings, the other two parts being connected to the first part at said openings, one of the other parts extending below the first part and having a trap and the other having a steam space.

13. In a feedwater heater, a heater vessel, a spray-head in said vessel and removable trays arranged laterally of said spray-head and above the same.

14. In a feedwater heater, a heater vessel, a spray-head for spraying water upwardly therein, a deflecting member above said spray-head and a tray arranged around the inside of the heater vessel above said spray-head.

15. In a feedwater heater, a heater vessel, a spray-head discharging water upwardly in said vessel, and a flanged tray arranged around the spray-head inside of said heater vessel.

16. In a feedwater heater, a heater vessel having a steam inlet and cold water inlet and having a hot water outlet, and detachable filtering means at the lower end of said heater vessel through which the hot water passes to said outlet.

17. In a feedwater heater, a steam heated vessel, a spray-head in said vessel having a plurality of outlets at least one of which is at a lower level than the remainder and adapted to be flooded by high water in said vessel, a pump for forcing water through said outlets into said vessel and for withdrawing water from said vessel, and means for automatically closing some of said outlets.

18. In a feedwater heater, a steam heated vessel, a spray-head therein having a plurality of spray outlets, means controlled by the steam pressure in the vessel for closing at least one of said outlets, at least one other of said outlets being at a lower level than the before-mentioned outlet and adapted to be flooded.

19. In a feedwater heater, a steam heated vessel, a spray-head having a plurality of outlets, one of said outlets being at a lower level than the others and adapted to be flooded, a pump, and means controlled by the action of the steam in said vessel for opening and closing the other outlets.

20. In a feedwater heater, a steam heated vessel, a pump for supplying cold water thereto, an exhaust steam connection to said vessel, means for automatically reducing the supply of water from the pump when the exhaust steam pressure is reduced below a predetermined point, and means for automatically returning hot water to the heater side of the pump.

21. In a feedwater heater, a steam heated vessel, a pump for supplying water thereto, means for automatically reducing the supply of water to the heater vessel when the steam pressure in said vessel is reduced below a predetermined point, float controlled means for preventing an accumulation of excess water in the heater vessel, and means for returning hot water to the heater side of the pump.

22. In a feedwater heater, a steam heated vessel, pumping means for forcing water into and out of said vessel, means for reducing the supply of cold water as the steam supply to said vessel is decreased, and an emergency low water controlled means for returning hot water to the heater side of the system.

23. In a feedwater heater, a steam heated vessel, two pump cylinders and pistons for pumping water alternately into said vessel, means for automatically synchronizing the movements of said pistons and means for by-passing cold water from one pump cylinder to the other.

24. In a feedwater heater, a heater vessel for exhaust steam and water and having two openings, a filter member detachably secured to said vessel and in communication with said openings and closures for said openings to permit the removal of said filter.

25. In a feedwater heater, a steam heated vessel having a partition in the lower part with a passage through said partition and openings in an outer wall on opposite sides of said partition, a filter detachably connected to said vessel at said openings and closures for said openings and said passage to permit the removal of said filter without interfering with the operation of said heater.

26. In a feedwater heater, a heater vessel having two openings in a side wall adjacent each other, a filter having two openings adapted to register with the openings in the heater vessel and having a partition dividing the filter into two parts through which the water circulates from one opening to the other.

27. In a feedwater heater, a vessel heated by exhaust steam, a spray-head in said vessel, a steam driven pump for forcing water through said spray-head into said vessel, means actuated by the pressure of steam in said vessel for varying the live steam supplied to said pump and means actuated by the pressure of exhaust steam in said vessel for varying the discharge through said spray-head.

28. In a feedwater heater, a vessel heated by exhaust steam, a steam driven pump for forcing water into said vessel, a governor for controlling the flow of steam to said steam driven pump, said governor being actuated by the steam which heats said vessel so as to increase the flow of steam to said pump when pressure in said heater rises.

29. In a feedwater heater, a vessel heated by exhaust steam, a steam driven pump for forcing water into said vessel and means for reducing the power of the pump and means for increasing the resistance to the action of the pump when the pressure of the exhaust steam in said vessel is decreased.

30. In a feedwater heater, a heater vessel, a pump for forcing water into said vessel and taking water from said vessel, means controlled by the pressure in said vessel for slowing down the pump when the pressure decreases below a certain point, and a float controlled by the level of water in said vessel adapted to operate said means independently of the pressure in said vessel.

31. In a construction of the character described, a heater vessel, means for admitting steam thereto, a spray head in said vessel, means for forcing water through said spray head into said vessel, and a valve mechanism operated alternatively by changes in steam pressure and changes in water level for varying the passage of water through said spray head.

32. In a construction of the character described, a heater vessel, means for admitting steam thereto, a spray head, a pump for forcing water through said spray head into said vessel and mechanism operable independently by changes in steam pressure and changes in water level in said vessel for varying the speed of the pump.

33. In an apparatus of the character described, the combination of a heater vessel, a spray head, a pump for forcing water through said spray head into said vessel, and an emergency low water device for reducing the speed of the pump when the water falls below a predetermined level.

34. In an apparatus of the character described, a heater vessel, means for admitting steam thereto, a spray head, a pump for forcing water through said spray head into said vessel, a valve for controlling the flow of water through said spray head, steam pressure operated means for operating said valve and water level operated means for operating said valve.

35. In an apparatus of the character described, a heater vessel, a pump for forcing water into said vessel, means for slowing down said pump, means for preventing the water from rising above a given level in said vessel and a single float for controlling both of said means.

36. In an apparatus of the character described, a heater vessel, a pump for forcing water into said vessel, a float, means operated by said float for retarding said pump when the water falls to a predetermined level, and means controlled by said float for decreasing the cold water supply to said vessel when the water level rises to a predetermined height.

37. In a locomotive feedwater heater, a heater vessel, means for supplying steam to said vessel from the main engine exhaust, a pump for feeding cold water to said vessel, withdrawing hot water from said vessel and forcing it to the boiler, means for automatically controlling the speed of said pump to reduce the same when the main exhaust is below normal, and means for supplying a supplemental exhaust to said heater vessel when said main exhaust is below a predetermined amount.

38. In a locomotive feedwater heater, a heater vessel, means for supplying steam thereto from the main engine exhaust, a pump for delivering water from said vessel to the boiler, means for reducing the speed of said pump when the main supply of exhaust steam is decreased, and means for supplying supplemental steam to the heater vessel when the main supply is deficient.

39. In a locomotive feedwater heater, a heater vessel, means for supplying steam thereto from the main engine exhaust, a pump for delivering water from said vessel to the boiler, means for reducing the speed of said pump when the main supply of exhaust steam is decreased, means for supplying supplemental steam to the heater vessel when the main supply is deficient, and means for shutting off the supplemental supply when the main supply again reaches a predetermined value and the speed of the pump has increased a certain amount.

40. In a feed water heater, an exhaust steam heated vessel having a vent to atmosphere for the escape of exhaust steam and entrapped air and a receiving means for at least partly condensing the escaping steam.

41. In a feed water heater, an exhaust steam heated vessel having a vent to atmosphere for the escape of exhaust steam and entrapped air, a receiving means for at least partly condensing the escaping steam, and means for regulating the amount of escaping steam.

42. In a feed water heater, a heater vessel, a pump having valve controlled inlets and outlets for forcing cold water into said vessel and withdrawing hot water from said vessel and forcing it to a boiler, and a valve controlled hot water by-pass between the outer hot water end of the pump and the opposite side of the hot water suction valve for returning deficit hot water to the vessel when needed to permit variation in the ratio between the capacities of the hot and cold water ends of the pump.

43. In a feed water heater, a heater vessel, cold water pumping means having two pumping chambers alternately supplying cold water to a heater vessel, means for maintaining a normal water level within said vessel including a by-pass connecting said cold water pumping chambers, and a float in the vessel which controls the passage of water so that varying amounts of cold water may pass from one chamber to the other and thus keep excess cold water out of the heater vessel.

44. In a feed water heater, a heater vessel, means for supplying exhaust steam to the heater vessel, means for supplying cold water to said vessel and withdrawing hot water from said vessel, and automatic means controlled by the pressure of the exhaust steam for reducing the amount of hot water withdrawn from said vessel as the pressure of the exhaust steam is decreased.

EDMUND H. BLUNT.